United States Patent
Zhu

(10) Patent No.: US 11,442,969 B2
(45) Date of Patent: Sep. 13, 2022

(54) COMPUTER-BASED SYSTEMS CONFIGURED FOR EFFICIENT ENTITY RESOLUTION FOR DATABASE MERGING AND RECONCILIATION

(71) Applicant: Capital One Services, LLC, McLean, VA (US)

(72) Inventor: Xiaoyuan Zhu, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 336 days.

(21) Appl. No.: 16/857,802

(22) Filed: Apr. 24, 2020

(65) Prior Publication Data

US 2021/0334295 A1 Oct. 28, 2021

(51) Int. Cl.
*G06F 16/29* (2019.01)
*G06F 16/2455* (2019.01)

(52) U.S. Cl.
CPC ........ *G06F 16/29* (2019.01); *G06F 16/24558* (2019.01)

(58) Field of Classification Search
CPC ...................................................... G06F 16/29
USPC ........................................................ 701/532
See application file for complete search history.

(56) References Cited

U.S. PATENT DOCUMENTS

| | | | | |
|---|---|---|---|---|
| 8,108,411 B2* | 1/2012 | Uppala | ..................... | G06F 7/32 707/752 |
| 8,838,652 B2* | 9/2014 | Jensen | ..................... | G06F 16/00 707/613 |
| 9,020,988 B2* | 4/2015 | Rubenstein | ....... | G06F 16/24556 707/723 |
| 10,305,845 B1* | 5/2019 | Waagen | ................ | H04L 67/306 |
| 10,803,050 B1* | 10/2020 | Salkola | ................... | G10L 15/26 |
| 11,157,926 B2* | 10/2021 | Guan | ................. | G06Q 30/0263 |
| 11,200,239 B2* | 12/2021 | Smart | ................ | G06F 16/2282 |
| 11,288,315 B2* | 3/2022 | Xu | ....................... | G06F 16/2458 |
| 2004/0139072 A1* | 7/2004 | Broder | ................. | G06F 16/284 |
| 2008/0134088 A1* | 6/2008 | Tse | ...................... | G06F 16/9537 715/810 |
| 2009/0077078 A1* | 3/2009 | Uppala | ..................... | G06F 7/32 |
| 2009/0240694 A1* | 9/2009 | Jensen | ................... | G06F 16/00 707/999.102 |
| 2009/0254588 A1* | 10/2009 | Li | ......................... | G06F 16/283 |
| 2014/0188948 A1* | 7/2014 | Rubenstein | ........... | G06Q 30/06 707/821 |

(Continued)

*Primary Examiner* — Reza Nabi
(74) *Attorney, Agent, or Firm* — Greenberg Traurig, LLP

(57) ABSTRACT

To facilitate efficient entity resolution, systems and methods include a first dataset is received from a first database associated with a first entity and a second dataset is received from a second database associated with a second entity. A geo-grid is mapped to a geographical area covering the first entity data records and the second entity data records. A grid matching area in the geo-grid is generated for each first entity data record based on latitude data and longitude data of each first entity data record. Candidate matching records are determined from the second entity data records based on respective grid matching areas. Actual matching records are determined from the candidate matching records based on a threshold for a trigram similarity between each candidate matching record and the respective first entity data record. The actual matching records are associated with the respective first entity data record in the first database.

20 Claims, 8 Drawing Sheets

(56) References Cited

U.S. PATENT DOCUMENTS

| | | | |
|---|---|---|---|
| 2015/0070383 A1* | 3/2015 | Da Veiga | G06F 16/904 345/629 |
| 2016/0092557 A1* | 3/2016 | Stojanovic | G06F 16/35 707/723 |
| 2016/0124993 A1* | 5/2016 | Watson | G06F 16/20 707/690 |
| 2018/0052904 A1* | 2/2018 | Fusco | G06F 16/9535 |
| 2018/0081946 A1* | 3/2018 | Bondalapati | G06F 16/2456 |
| 2018/0246989 A1* | 8/2018 | Xu | G06F 16/9024 |
| 2019/0278777 A1* | 9/2019 | Malik | G06F 16/9024 |
| 2019/0354544 A1* | 11/2019 | Hertz | G06N 5/00 |
| 2020/0034823 A1* | 1/2020 | Rollings | G06Q 20/34 |
| 2020/0218741 A1* | 7/2020 | Ahuja | G06F 16/221 |
| 2021/0056084 A1* | 2/2021 | Guha | G06F 16/258 |
| 2021/0182659 A1* | 6/2021 | Makhija | G06V 30/40 |
| 2021/0199831 A1* | 7/2021 | Lunny | G01V 1/40 |
| 2021/0334275 A1* | 10/2021 | Smart | G06F 16/2456 |
| 2021/0390502 A1* | 12/2021 | Phillips | G06F 16/29 |

\* cited by examiner

COMPUTER-BASED SYSTEMS CONFIGURED FOR EFFICIENT ENTITY RESOLUTION FOR DATABASE MERGING AND RECONCILIATION

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC, All Rights Reserved.

FIELD OF TECHNOLOGY

The present disclosure generally relates to computer-based systems configured for one or more novel technological applications of efficient entity resolution for database merging and reconciliation.

BACKGROUND OF TECHNOLOGY

A computer system may include a group of computers (e.g., clients, servers, smart routers) and other computing hardware devices that are linked together through one or more communication channels to facilitate communication and resource-sharing, via one or more specifically programmed graphical user interfaces (GUIs), among a wide range of users.

Some of the computing devices in the system may store datasets. Datasets can often have large quantities of data records. When merging or otherwise employing two or more datasets, there may be overlap in information stored in the data records of each dataset. Sorting through all of the records in each dataset to remove duplicates can be a slow, resource intensive and inefficient process.

SUMMARY OF DESCRIBED SUBJECT MATTER

In some embodiments, the present disclosure provides an exemplary technically improved computer-based method that includes the following steps of receiving, by at least one processor, at least one first dataset from a first database associated with a first entity; where the at least one first dataset includes a plurality of first entity data records; where each of the first entity data records includes: i) first latitude data representing at least one first latitude associated with at least one first physical location at which each of the first entity data records has been generated, and ii) first longitude data representing at least one first longitude associated with the at least one first physical location at which each of the first entity data records has been generated. The at least one processor receives at least one second dataset from an at least one second database associated with at least one second entity; where the at least one second dataset includes a plurality of second entity data records; i) at least one second latitude data representing at least one second latitude associated with at least one second physical location at which each of the at least one second entity data records has been generated, and ii) at least one second longitude data representing at least one second longitude associated with the at least one second physical location at which each of the at least one second entity data records has been generated. The at least one processor generates at least one geo-grid mapped to at least one geographical area covering the plurality of first entity data records and the plurality of second entity data records; where the at least one geo-grid includes a plurality of respective grid spaces representing a plurality of respective geographical sub-areas; where the plurality of respective grid spaces are defined by respective latitudinal widths and respective longitudinal heights; where each pair of a respective latitudinal width and a respective longitudinal height is based on a predetermined distance threshold between a plurality of candidate matching records of the plurality of first entity data records and the plurality of second entity data records. The at least one processor generates at least one respective grid matching area in the at least one geo-grid for at least one respective first entity data record based at least in part on the first latitude data and the first longitude data of the at least one respective first entity data record; where the at least one respective grid matching area for the at least one respective first entity data record includes: i) a first entity data record grid space of the plurality of respective grid spaces in the at least one geo-grid, where the first entity data record grid space is associated with a respective pair of the respective latitude and the respective longitude for each respective first entity data records, and ii) a plurality of neighboring grid spaces that neighbor the first entity data record grid space in the at least one geo-grid. The at least one processor determines the plurality of candidate matching records from the plurality of second entity data records that potentially matches to the plurality of first entity data records and the plurality of second entity data records based on the at least one respective grid matching area; where the plurality of candidate matching records are records that have respective latitudes and respective longitudes match the at least one respective grid matching area. The at least one processor determines a plurality of actual matching records from the plurality of candidate matching records based on a predetermined threshold for a trigram similarity between each candidate matching record of the plurality of candidate matching records and the at least one respective first entity data record. The at least one processor extracts the plurality of actual matching records from the at least one second dataset. The at least one processor stores the plurality of actual matching records in the first database. The at least one processor associates the plurality of actual matching records in the first database with the at least one respective first entity data record.

In some embodiments, the present disclosure provides an exemplary technically improved computer-based method that includes the following steps of receiving, by at least one processor, at least one first dataset from a first database associated with a first entity; where the at least one first dataset includes a plurality of first entity data records; where each of the first entity data records includes: i) first latitude data representing at least one first latitude associated with at least one first physical location at which each of the first entity data records has been generated, and ii) first longitude data representing at least one first longitude associated with the at least one first physical location at which each of the first entity data records has been generated. The at least one processor receives at least one second dataset from an at least one second database associated with at least one second entity; where the at least one second dataset includes a plurality of second entity data records; i) at least one second latitude data representing at least one second latitude associated with at least one second physical location at which each of the at least one second entity data records has been generated, and ii) at least one second longitude data representing at least one second longitude associated with the at least one second physical location at which each of the at least one second entity data records has been generated. The at least one processor generates at least one geo-grid mapped to at least one geographical area covering the plurality of first entity data records and the plurality of at one second entity data records; where the at least one geo-grid includes a plurality of respective grid spaces representing a plurality of respective geographical sub-areas; where the plurality of respective grid spaces are defined by respective latitudinal widths and respective longitudinal heights; where each pair of a respective latitudinal width and a respective longitudinal height are based on a predetermined distance threshold between a plurality of candidate matching records of the plurality of first entity data record and the plurality of second entity data records. The at least one processor generates at least one respective grid matching area in the at least one geo-grid; where the respective grid matching area includes: i) a central grid space of the grid spaces in the geo-grid, and ii) a plurality of neighboring grid spaces that neighbor the central grid space in the at least one geo-grid. The at least one processor determines a plurality of matching first entity data records of the plurality of first entity data records based on the at least one respective grid matching area; where the plurality of matching first entity data records are record that have respective latitudes and respective longitudes that match the at least one respective grid matching area; The at least one processor determines a plurality of matching second entity data records of the plurality of second entity data records based on the at least one respective grid matching area; where the plurality of matching second entity data records are record that have respective latitudes and respective longitudes that match the at least one respective grid matching area. The at least one processor determines a plurality of actual matching records from the plurality of matching second entity data records based on a predetermined threshold for a trigram similarity between each matching second entity data record of the plurality of matching second entity data records and each matching first entity data record of the plurality of matching first entity data records. The at least one processor extracts the plurality of actual matching records from the at least one second dataset. The at least one processor stores the plurality of actual matching records in the first database. The at least one processor associates the plurality of actual matching records in the first database with the at least one respective first entity data records.

In some embodiments, the present disclosure provides an exemplary technically improved computer-based system that includes the following components of a first entity database configured to store at least one first dataset associated with at least one first entity, where the first dataset includes a plurality of first entity data records, where each of the at least one first entity data records includes: i) first latitude data representing at least one first latitude associated with at least one first physical location at which each of the first entity data records has been generated, and ii) first longitude data representing at least one first longitude associated with the at least one first physical location at which each of the first entity data records has been generated; and at least one second entity database configured to store at least one second dataset associated with at least one second entity, where the at least one second dataset includes a plurality of at least one second entity data records; i) at least one second latitude data representing at least one second latitude associated with at least one second physical location at which each of the at least one second entity data records has been generated, and ii) at least one second longitude data representing at least one second longitude associated with the at least one second physical location at which each of the at least one second entity data records has been generated. The system further includes at least one processor configured to perform computer-readable instructions including: receiving the at least one first dataset from the first database associated with a first entity; receiving the at least one second dataset from the at least one second database associated with at least one second entity; generating at least one geo-grid mapped to at least one geographical area covering the plurality of first entity data records and the plurality of second entity data records; where the at least one geo-grid includes a plurality of respective grid spaces representing a plurality of respective geographical sub-areas; where the plurality of respective grid spaces are defined by respective latitudinal widths and respective longitudinal heights; where each pair of a respective latitudinal width and a respective longitudinal height is based on a predetermined distance threshold between a plurality of candidate matching records of the plurality of first entity data records and the plurality of second entity data records; generating at least one respective grid matching area in the at least one geo-grid for at least one respective first entity data record based at least in part on the first latitude data and the first longitude data of the at least one respective first entity data record; where the at least one respective grid matching area for the at least one respective first entity data record includes: i) a first entity data record grid space of the plurality of respective grid spaces in the at least one geo-grid, where the first entity data record grid space is associated with a respective pair of the respective latitude and the respective longitude for each respective first entity data records, and ii) a plurality of neighboring grid spaces that neighbor the first entity data record grid space in the at least one geo-grid; determining plurality of candidate matching records from the plurality of second entity data records that potentially matches to the plurality of first entity data records and the plurality of second entity data records based on the at least one respective grid matching area; where the plurality of candidate matching records are records that have respective latitudes and respective longitudes match the at least one respective grid matching area; determining a plurality of actual matching records from the candidate matching records based on a predetermined threshold for a trigram similarity between each candidate matching record of the plurality of candidate matching records and the at least one respective first entity data record; extracting the plurality of actual matching records from the at least one second dataset; storing the plurality of actual matching records in the first database; and associating the plurality of actual matching records in the first database with the at least one respective first entity data record.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIGS. 1-8 show one or more schematic flow diagrams and certain computer-based architectures which are illustrative of some exemplary aspects of at least some embodiments of the present disclosure.

DETAILED DESCRIPTION

Figure 1:
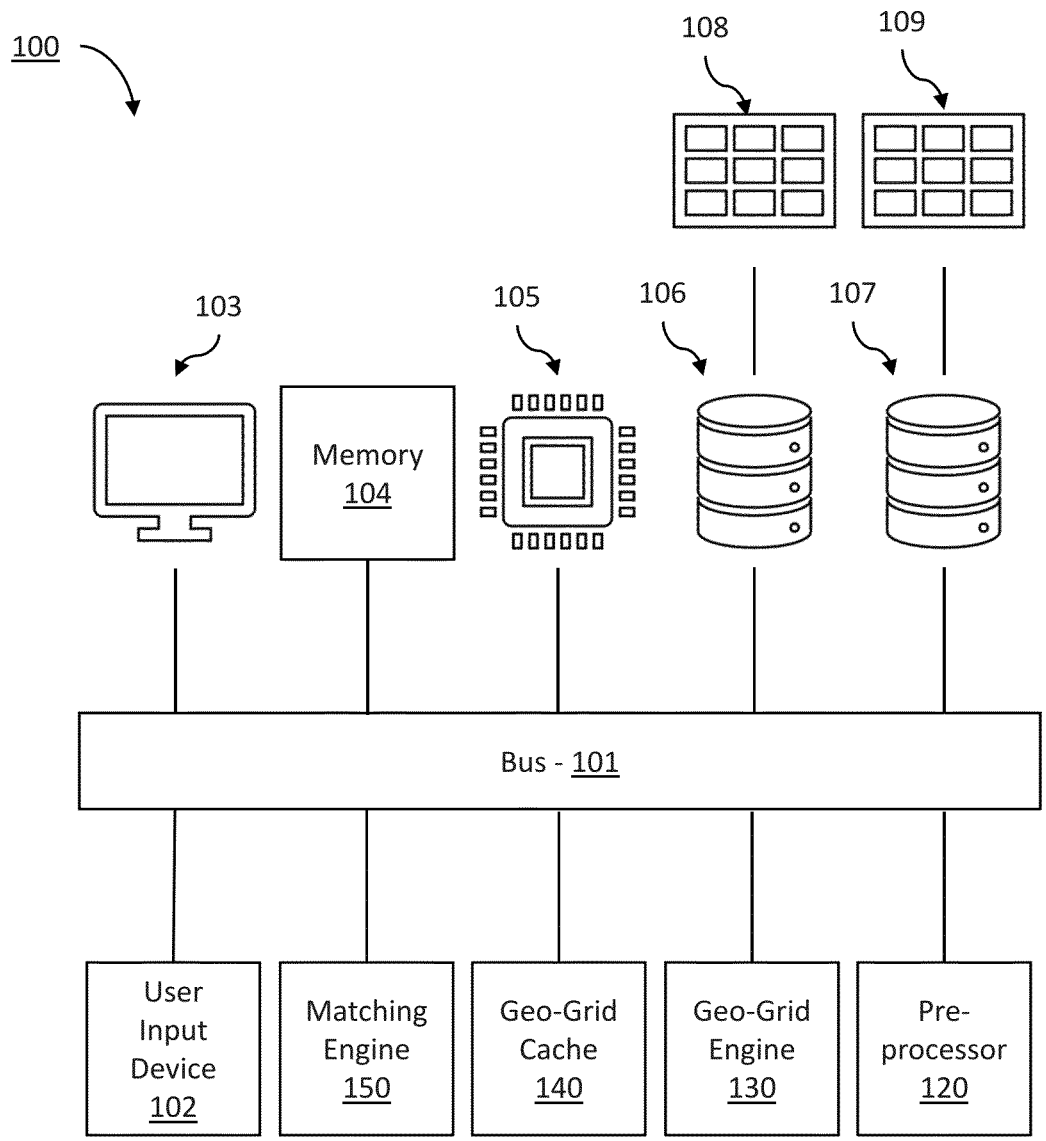

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect or functionality of various embodiments described herein can be performed in real-time and dynamically. As used herein, the term "real-time" is directed to an event or action that can occur instantaneously or almost instantaneously in time when another event or action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and linguistic relatives or derivatives, mean that certain events and actions can be triggered or occur without any human intervention. In some embodiments, events and actions in accordance with the present disclosure can be in real-time or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, specially programmed computing systems with associated devices are configured to operate in the distributed network environment, communicating with one another over one or more suitable data communication networks (e.g., the Internet, satellite, etc.) and utilizing one or more suitable data communication protocols or modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiments, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component or a combination of at least one software component and at least one hardware component which are designed, programmed, or configured to manage or control other software and hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements or software elements or both may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and computing software languages (e.g., C++, Objective-C, Swift, Java, JavaScript, Python, Perl, QT, etc.).

In some embodiments, one or more illustrative embodiments of computer-based systems of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more illustrative embodiments of computer-based systems of the present disclosure may obtain, manipulate, transfer, store, transform, generate, or output any digital object or data unit (e.g., from inside or outside of a particular application) that can be in any suitable form such as, without limitation, a file, a contact, a task, an email, a tweet, a map, an entire application (e.g., a calculator), etc. In some embodiments, as detailed herein, one or more illustrative embodiments of computer-based systems of the present disclosure may be implemented across one or more of various computer platforms such as, but not limited to: (1) AmigaOS, AmigaOS 4, (2) FreeBSD, NetBSD, OpenBSD, (3) Linux, (4) Microsoft Windows, (5) OpenVMS, (6) OS X (Mac OS), (7) OS/2, (8) Solaris, (9) Tru64 UNIX, (10) VM, (11) Android, (12) Bada, (13) BlackBerry OS, (14) Firefox OS, (15) iOS, (16) Embedded Linux, (17) Palm OS, (18) Symbian, (19) Tizen, (20) WebOS, (21) Windows Mobile, (22) Windows Phone, (23) Adobe AIR, (24) Adobe Flash, (25) Adobe Shockwave, (26) Binary Runtime Environment for Wireless (BREW), (27) Cocoa (API), (28) Cocoa Touch, (29) Java Platforms, (30) JavaFX, (31) JavaFX Mobile, (32) Microsoft XNA, (33) Mono, (34) Mozilla Prism, XUL and XULRunner, (35) .NET Framework, (36) Silverlight, (37) Open Web Platform, (38) Oracle Database, (39) Qt, (40) SAP NetWeaver, (41) Smartface, (42) Vexi, and (43) Windows Runtime.

In some embodiments, illustrative embodiments of computer-based systems of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative embodiments of computer-based systems of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative embodiments of computer-based systems of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects or combinations thereof. For example, such projections may be a visual overlay for a mobile augmented reality (MAR) application.

In some embodiments, illustrative embodiments of computer-based systems of the present disclosure may be configured to be utilized in various applications which may include, but not limited to, gaming, mobile-device games, video chats, video conferences, live video streaming, video streaming and augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, the terms "proximity detection," "locating," "location data," "location information," and "location tracking" refer to any form of location tracking technology or locating method that can be used to provide a location of, for example, a particular computing system of the present disclosure or any associated computing devices, based at least in part on one or more of the following techniques and devices, without limitation: accelerometer(s), gyroscope(s), Global Positioning Systems (GPS); GPS accessed using Bluetooth™; GPS accessed using any reasonable form of wireless or non-wireless communication or combination thereof; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the illustrative embodiments of computer-based systems of the present disclosure may be configured to securely store and transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein, or a consumer of data supplied by a data provider. By way of example, and not limitation, the terms "user" or "subscriber" can refer to a person who receives data provided by the data or service provider over the Internet in a browser session or can refer to an automated software application which receives the data and stores or processes the data.

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

FIGS. 1 through 8 illustrate systems and methods of database interoperability and dataset resolution. The following embodiments provide technical solutions or technical improvements that overcome technical problems, drawbacks and deficiencies in the technical fields involving dataset import, database interoperability, and record reconciliation. As explained in more detail, below, technical solutions and technical improvements herein include aspects of improved entity resolution through improved database communication and interoperability. Based on such technical features, further technical benefits become available to users and operators of these systems and methods. Moreover, various practical applications of the disclosed technology are also described, which provide further practical benefits to users and operators that are also new and useful improvements in the art.

FIG. 1 is a grid matching area diagram of another exemplary computer-based system for entity resolution with geo-gridding in accordance with one or more embodiments of the present disclosure.

In some embodiments, an exemplary inventive entity resolution system 100 includes a computing system having multiple components interconnect through, e.g., a communication bus 101. In some embodiments, the communication bus 101 may be a physical interface for interconnecting the various components, however in some embodiments, the communication bus 101 may be a network interface, router, switch, or other communication interface. The entity resolution system 100 may receive a first set of records 108 and second set of records 109, and the various components may interoperate to match data items from each set of records using geo-grid filters.

In some embodiments, the entity resolution system 100 may include a processor 105, such as, e.g., a complex instruction set (CISC) processor such as an x86 compatible processor, or a reduced instruction set (RISC) processor such as an ARM, RISC-V or other instruction set compatible processor, or any other suitable processor including graphical processors, field programmable gate arrays (FPGA), neural processors, etc.

In some embodiments, the processor 108 may be configured to perform instructions provided via the bus 101 by, e.g., accessing data stored in a memory 104 via the communication bus 101. In some embodiments, the memory 104 may include a non-volatile storage device, such as, e.g., a magnetic disk hard drive, a solid-state drive, flash memory, or other non-volatile memory and combinations thereof, a volatile memory such as, e.g., random access memory (RAM) including dynamic RAM, static RAM, other volatile memory devices and combinations thereof. In some embodiments, the memory 104 may store data resulting from processing operations, a cache or buffer of data to be used for processing operations, operation logs, error logs, security reports, among other data related to the operation of the entity resolution system 100.

In some embodiments, a user or administrator may interact with the entity resolution system 100 via a display 103 and a user input device 102. In some embodiments, the user input device 102 may include, e.g., a mouse, a keyboard, a touch panel of the display 103, motion tracking or detecting, a microphone, an imaging device such as a digital camera, among other input devices. Results and statuses related to the entity evaluation system 110 and operation thereof may be displayed to the user via the display 103.

In some embodiments, a first source database 106 may communicate with the entity resolution system 100 via, e.g., the communication bus 101 to provide the first source records 108. In some embodiments, the first source records 108 may include records having data items associated with first entities, such as, e.g., commercial entities, including merchants, industrial entities, firms and businesses, as well as individuals, governmental organizations, or other entities. For example, the first entities may include, e.g., consumers and businesses, and the data items may include, e.g., transactions and associated data such as, e.g., time data, location data (e.g., address, latitude-longitude, relational location data, among other types of location data), party data, transaction details, among other data. In some embodiments, the first source records 108 are collected from the first source database 106 including, e.g., a consumer transaction database, a merchant database, a company database, or any other database of entity records. For example, in some embodiments, the first source database 106 may include, e.g., a credit card account database recording credit card transactions as records of activity, or other bank account databases and financial account databases, and combinations thereof. In another example, the first source database 106 may include, e.g., a database of businesses and merchants having physical locations.

In some embodiments, a second source database 107 may communicate with the entity resolution system 100 to provide second source records 109 via, e.g., the communication bus 101. In some embodiments, the second source records 109 may be associated with second entities, such as, e.g., commercial entities, including merchants, industrial entities, firms and businesses, as well as individuals, governmental organizations, or other entities that are the same or different from the first entities. For example, the first entities may include, e.g., consumers or businesses, and the data items may include, e.g., transactions and associated data such as, e.g., time data, location data (e.g., address, latitude-longitude, relational location data, among other types of location data), party data, transaction details, among other data. In some embodiments, the first source records 109 are collected from the first source database 107 including, e.g., a consumer transaction database, a merchant database, a company database, or any other database of entity records. For example, in some embodiments, the first source database 107 may include, e.g., a credit card account database recording credit card transactions as records of activity, or other bank account databases and financial account databases, and combinations thereof. In another example, the first source database 107 may include, e.g., a database of businesses and merchants having physical locations.

In some embodiments, the entity resolution system 100 may integrate the first source records 108 and the second source records 109 into a single dataset. Accordingly, in some embodiments, a set of components communicate with the communication bus 101 to provide resources for, e.g., matching first source records 108 with second source records 109, including, e.g., forming a set of candidate matching records using geo-grids.

In some embodiments, a pre-processor 120 receives the first source records 108 and the second source records 109. In some embodiments, the pre-processor 120 may include, e.g., a memory having instructions stored thereon, as well as, e.g., a buffer to load data and instructions for processing, a communication interface, a controller, among other hardware. A combination of software and/or hardware may then be implemented by the pre-processor 120 in conjunction with the processor 105 or a processor dedicated to the pre-processor 120 to implement the instructions stored in the memory of the pre-processor 120.

In some embodiments, the first source records 108 and the second source records 109 include raw data from the collection of entity activities. As such, the data items from the first source records 108 and the second source records 109 may include, e.g., a variety of data formats, a variety of data types, unstructured data, duplicate data, among other data variances. Thus, to facilitate processing and using the data for consistent and accurate results, the data may be pre-processed to remove inconsistencies, anomalies and variances. Thus, in some embodiments, the pre-processor 120 may ingest, aggregate, or cleanse, among other pre-processing steps and combinations thereof, the data items from each of the first source records 108 and the second source records 109.

Using the pre-processor 120, the first source records 108 may be compiled into a single structure, such as, e.g., a single file, a single table, a single list, or other data container having consistent data item types. For example, each first source record may be added to, e.g., a table with data items identified for each of, e.g., a merchant name, a merchant address, website, phone number, among other fields. The format of each field may be consistent across all records after pre-processing by the pre-processor 120 such that each record has a predictable representation of the data recorded therein.

Similarly, using the pre-processor 120, the second source records 109 may be compiled into a single structure, such as, e.g., a single file, a single table, a single list, or other data container having consistent data item types. For example, each second source record may be added to, e.g., a table with data items identified for each of, e.g., a merchant name, among other fields. The format of each field may be consistent across all records after pre-processing by the pre-processor 120 such that each record has a predictable representation of the data recorded therein.

In some embodiments, the structures containing each of the pre-processed first source records and the pre-processed second source records may be stored in, e.g., a database or a storage, such as, e.g., the memory 104, or a local storage of the pre-processor 120.

In some embodiments, a geo-grid engine 130 receives the pre-processed first source records 108 and the pre-processed second source records 109. In some embodiments, the geo-grid engine 130 may include, e.g., a memory having instructions stored thereon, as well as, e.g., a buffer to load data and instructions for processing, a communication interface, a controller, among other hardware. A combination of software and/or hardware may then be implemented by the geo-grid engine 130 in conjunction with the processor 105 or a processor dedicated to the geo-grid engine 130 to implement the instructions stored in the memory of the geo-grid engine 130.

In some embodiments, the geo-grid engine 130 utilizes location data from each of the first source records 108 and the second source records 109 to filter out unlikely matches in a quick and efficient manner. Because the first source records 108 and the second source records 109 may include large numbers of records, such as, e.g., hundreds, thousands, tens of thousands, hundreds of thousands or more records in each dataset, assessing each combination of first source records 108 with second source records 109 would result in an impractically time and resource intensive process. In some embodiments, the geo-grid engine 130 may improve the efficiency of the entity resolution system 100 by, e.g., using the location data to reduce a number of candidate matches in large batches without resorting to comparing individual records.

In some embodiments, the geo-grid engine 130 may construct a geo-grid for the records of the first source records 108 and the second source records 109. In some embodiments, the geo-grid engine 130 uses the first source records 108 to determine a geo-grid size and position based on a maximum and minimum longitude and a maximum and minimum latitude of longitude data and latitude data in each first source record 108. However, in some embodiments, the geo-grid engine 130 uses the second source records 109 to determine a geo-grid size and position based on a maximum and minimum longitude and a maximum and minimum latitude of longitude data and latitude data in each second source record 109. In some embodiments, the geo-grid engine 130 uses the latitude and longitude data from both the first and the second source records 108 and 109, respectively. While in still other embodiments, the geo-grid engine 130 maintains a geo-grid for all geographic areas of interest, such as, e.g., a geo-grid over the contiguous United States, a geo-grid over continental Europe, a geo-grid over continental Asia, a geo-grid over Australia, a geo-grid over Canada, a geo-grid over North America, a geo-grid for each state in the United States, or any other geographic region.

In some embodiments, the geo-grid includes a two-dimensional grid of geo-grid cells where the geo-grid is constructed to scale based on, e.g., latitude and longitude. Thus, in some embodiments, a geo-grid spacing to form the geo-grid cells may be characterized by a height and a width of each cell based on, e.g., a longitudinal displacement and a latitudinal displacement, respectively.

In some embodiments, the longitudinal displacement and the latitudinal displacement are determined based on, e.g., a predetermined grid spacing distance, a user configurable grid spacing distance, or other grid spacing distance. In some embodiments, the grid spacing distance defines a height and a width of each square geo-grid cell. For example, a grid spacing distance of about 1 mile may be converted into a longitudinal displacement to determine a height of the geo-grid cells, and into a latitudinal displacement to determine a width of the geo-grid cells. In some embodiments, the grid spacing distance may include a distance selected from the range between about, e.g., one half mile and one mile, one mile and five miles, one mile and ten miles, one mile and twenty miles, or other range. In some embodiments, the grid spacing distance is determined based on prior study of entity resolution in datasets where, a pre-determined percent of ground truth record pairs (e.g., >99%, >98%, >97%, >97.5%, >96%, >95%, etc.) are within the grid spacing distance.

In some embodiments, each geo-grid cell may correspond to a longitude-latitude of, e.g., a center of the geo-grid cell, a vertex of the geo-grid cell, of each vertex of the geo-grid cell, or of a longitude range and latitude range associated with the geo-grid cell, among other identification techniques and combinations thereof.

In some embodiments, the geo-grid cells are rectangular in shape where the height and width distances are separately defined, or where a first percentage is applied to the grid spacing distance to determine width and a second percentage is applied to the grid spacing distance to determined height.

In some embodiments, the geo-grid cells may be any four-sided shape, such as, e.g., a square, a rhombus, a trapezoid, or other shape. In some embodiments, each grid cell may be assigned an index based on its location in the geo-grid. For example, where the grid cells and the geo-grid are rectangles, the geo-grid may form a rectangular grid including rows and columns. Each row and each column may be assigned an index, such as, e.g., alphabetical characters assigned to each row (e.g., A, B, C, D, etc.), and numerical characters assigned to each column (e.g., 1, 2, 3, 4, etc.). However, other indices are also contemplated, such as, e.g., roman numerals, Greek lettering, or other indices, and the indices for the rows and columns may be the same or different. In some embodiments, the row index and column index may be converted into one geo-grid index to identify each geo-grid cell to, e.g., reduce a two-dimensional identifier (e.g., [row_index, column_index]) to a one-dimensional index that may be used as a key for, e.g., a join operation. In some embodiments, the one-dimensional geo-grid index may be formed from the row index and the column index such as, e.g., if the number of columns is N, the row index is X, the column index is Y and the geo-grid cell index is Z, then the geo-grid cell index may be determined by, e.g., Z=X*N+Y, or other suitable transformation to convert a two-dimensional grid identifier to a one-dimensional index.

In some embodiments, the geo-grid may be represented graphically based on a conversion between latitude or longitude and a graphical coordinate system, such as, e.g., horizontal and vertical distance based on, e.g., pixels, inches, centimeters, millimeters, percentage of width or height, fraction of width or height, or other graphical coordinate system. In some embodiments, the geo-grid may be represented as an array with rows and columns representing latitudinal and longitudinal displacement, respectively, according to the geo-grid spacing distance. Other data formats for the geo-grid are contemplated, including, e.g., a table, a list, a tuple, text, among others and combinations thereof. The geo-grid may then be stored for quick and efficient access and use in a geo-grid cache 140 so that the geo-grid engine 130 may reference the geo-grid.

In some embodiments, the geo-grid engine 130 may utilize the stored geo-grid to map the first source records 108 and the second source records 109 to grid cells. In some embodiments, the geo-grid engine 130 may compare the latitude data and the longitude data of each record to the latitude data and the longitude data of each geo-grid cell, including, e.g., longitude-latitude position of one or more geo-grid cell vertices, longitude-latitude position of a center of each cell, latitudinal width, longitudinal height, the longitude positions of each vertical side and the latitude positions of each horizontal side, among other location data of the geo-grid cells. Thus, based on the location data of the records and of the geo-grid cells, each record may be assigned a geo-grid cell with an associated geo-grid cell index pair using the indices described above. Based on the geo-grid cells associated with each record, the records may be filtered by distance to remove unlikely matches.

In some embodiments, one of the first source records 108 or the second source records 109 may be the "primary dataset." Here, the primary dataset refers to a dataset against which other datasets are compared and merged into. However, in some embodiments, neither the first source records 108 nor the second source records 109 are a primary dataset, and the geo-grid engine 130 may select a primary dataset against which the other dataset will be compared. For example, the geo-grid engine 130 may select the first source records 108 as a primary dataset and compare the second source records 109 against each record of the first source records 108. In some embodiments, the geo-grid engine 130 may over-write the primary dataset with merged records, or the grid-engine 130 may create a separate dataset of merged records, or a combination thereof.

Accordingly, in some embodiments, the geo-grid engine 130 may iterate through the records of the primary dataset and select records from the remaining dataset or datasets that have associated geo-grid cells within a grid matching area of geo-grid cells, where the grid matching area includes all geo-grid cells within a threshold cell distance of the geo-grid cell associated with the primary dataset record. Here, the cell distance refers to the difference in location on the geo-grid as measured by geo-grid cells. For example, a cell distance of 1 would refer to a geo-grid cell that is one cell away. In some embodiments, the threshold cell distance may include, e.g., 1 cell, 2 cells, 5 cells, 10 cells, or other similarly suitable cell distance. In some embodiments, the threshold cell distance may be predetermined, however in some embodiments a user may configure a threshold cell distance via the user input device 102.

Accordingly, the geo-grid engine 130 may determine, for each primary dataset record, candidate matching records from the remaining dataset or datasets based on grid location. This is because records from a common entity may be from a common location. Some databases may represent entity records and the location data associated therewith using different formats or determined by different measurement techniques. Thus, the location of a single entity in two different record databases, e.g., the first record database 106 and the second record database 107, may have differing location data values, and thus be mapped to different geographic locations when analyzed by a particular system. Thus, in some embodiments, the threshold cell distance facilitates capturing records that, while having differing location data, may otherwise originate from a common entity. Thus, in some embodiments, using the geo-grid and the threshold cell distance, the geo-grid engine 130 may identify candidate matching records between the first source records 108 and the second source records 109 according to location similarity.

In some embodiments, the geo-grid engine 130 may further filter the candidate matching records of the candidate matching set by then removing candidate matching records that are greater than a threshold geographic distance from the associated primary records. In some embodiments, the threshold geographic distance is the same as the grid space distance described above. However, in some embodiments, the threshold geographic distance may be separately configured from the grid spacing distance by, e.g., user selection via the user input device 102, by a predetermined configuration, or by other means. In some embodiments, the threshold geographic distance may include a distance in the range of about, e.g., one half mile and one mile, one mile and five miles, one mile and ten miles, one mile and twenty miles, or other suitable range. In some embodiments, the threshold geographic distance is determined based on prior study of entity resolution in datasets where, e.g., 99%, 95%, 90%, etc. of records are within the threshold geographic distance.

In some embodiments, a matching engine 150 receives the candidate matching records of the first source records 108 and the second source records 109. In some embodiments, the matching engine 150 may include, e.g., a memory having instructions stored thereon, as well as, e.g., a buffer to load data and instructions for processing, a communication interface, a controller, among other hardware. A combination of software and/or hardware may then be implemented by the matching engine 150 in conjunction with the processor 105 or a processor dedicated to the matching engine 150 to implement the instructions stored in the memory of the matching engine 150.

In some embodiments, the matching engine 150 may analyze the candidate matching records for each record in the primary dataset. In some embodiments, the first source records 108 are the primary dataset, with each first source record having a candidate matching set of second source records 109. In some embodiments, the similarity matching engine 150 may compare data from the first source record to data of each second source record in the candidate matching set to determine a similarity score between the first source record and each candidate matching record. In some embodiments, the similarity score is based on, e.g., a location similarity and a name similarity.

In some embodiments, the matching engine 150 may use location data of each record to determine a geographic distance between the primary record and each candidate matching record in the candidate matching set based on latitude and longitude data. In some embodiments, a score is assigned to each candidate matching record based on the distance. However, in some embodiments, the candidate matching records are ranked according to distance. In some embodiments, the candidate matched records are both ranked and assigned a score.

In some embodiments, the candidate matched records of the candidate matching set are evaluated based on a similarity of name data to name data of the primary record. In some embodiments, the similarity is determined using, e.g., trigram similarity, or other string or semantic similarity methods. In some embodiments, the similarity measure is converted into a score and the candidate matching records are ranked or scored according to the similarity measure.

In some embodiments, one or more candidate matching records of each primary record may matched to the respective primary record based on the similarity measures. The candidate matching record having a similarity, e.g., above a similarity threshold, may be deemed a match to the primary record. In some embodiments the similarity scores are in a range between about 0 and about 1, and the similarity threshold may be about 0.8. In some embodiments, the matching engine 150 may log the matching records in, e.g., the memory 104. Based on the logged matching records, the matching engine 150 may redefine the name or location data of the matching records to reflect the name or location of the entity associated with the primary dataset of the first source records 108 and the second source records 109.

As a result, the matching engine 150 may reconcile the entity difference between records of the first and second source records 108 and 109 based on the similarity determined after geo-grid filtering. Duplicate records may then be determined, and the data from the duplicates removed or added to the primary record. Thus, the matching engine may combine the first source records 108 and the second source records 109 into a single dataset. In some embodiments, the resulting single dataset may be recorded and stored in a storage device such as, e.g., the memory 104, a database in communication with the matching engine 150, the database 106 or 107 of the primary dataset of the first source records 108 and the second source records 109, or other storage device.

Figure 2:
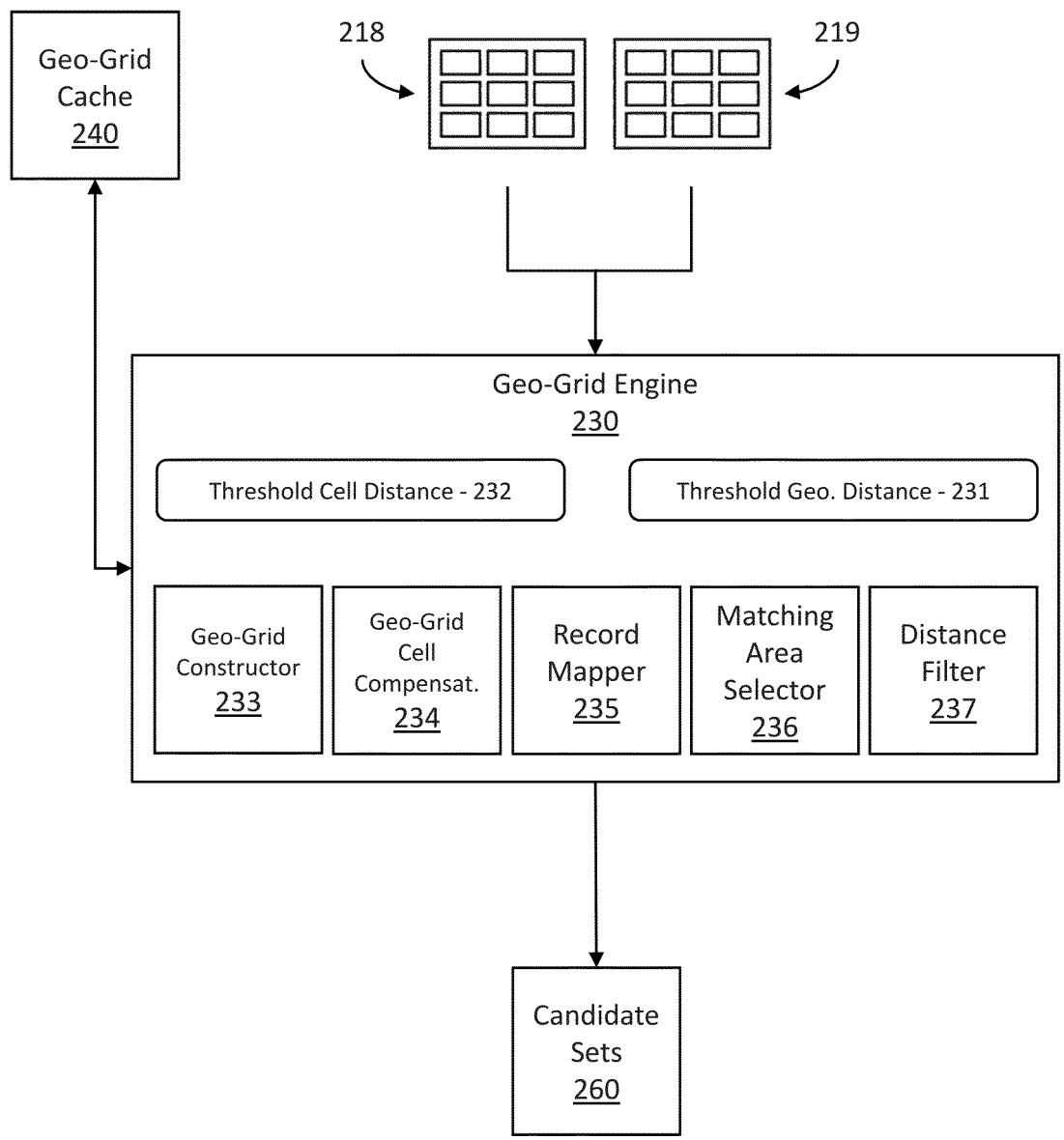

FIG. 2 is a grid matching area diagram of another exemplary computer-based system for entity resolution with geo-grid filtering in accordance with one or more embodiments of the present disclosure.

In some embodiments, a geo-grid engine 230 receives pre-processed primary dataset records 218 and pre-processed secondary dataset records 219. In some embodiments, the geo-grid engine 230 utilizes location data from each of the primary dataset records 218 and the secondary dataset records 219 to filter out unlikely matches in a quick and efficient manner. Because the primary dataset records 218 and the secondary dataset records 219 may include large numbers of records, such as, e.g., hundreds, thousands, tens of thousands, hundreds of thousands or more records in each dataset, assessing each combination of primary dataset records 218 with secondary dataset records 219 would result in an impractically time and resource intensive process. In some embodiments, the geo-grid engine 230 may improve the efficiency of, e.g., the entity resolution system 100 described above by, e.g., using the location data to reduce a number of candidate matches in large batches without resorting to comparing individual records.

In some embodiments, each record of the primary dataset records 218 and the secondary dataset records 219 include, e.g., latitude data and longitude data associated with the entity of the respective record. For example, the records may correspond to transactions and the location may be the location of the entity at which the transaction was made, such as, e.g., a purchase from a merchant at a particular location. In some embodiments, to filter out non-matching records, the geo-grid engine 230 may assume that records having locations greater than a threshold geographic distance 231 apart are too far apart to match. In some embodiments, the threshold geographic distance 231 may be user configured or pre-configured. In some embodiments, the threshold geographic distance 231 is learned based on statistical analysis of prior entity resolution processes where the threshold geographic distance 231 is, e.g., limited to the distance from records at which, e.g., 99%, 95%, 90%, etc. of matching records are found. In some embodiments, a user may configure the percentage, however in some embodiments the percentage is predetermined to balance the risk of incorrectly excluding actual matching records and resource consumption. In particular, in some embodiments, the threshold geographic distance 231 includes, e.g., about one half of a mile, about one mile, about two miles, about 5 miles, about 10 miles, or other suitable distance.

In some embodiments, a geo-grid constructor 233 of the geo-grid engine 230 may construct a geo-grid for the records of the primary dataset records 218 and the secondary dataset records 219 based on the threshold geographic distance 231. In some embodiments, the geo-grid engine 230 uses the primary dataset records 218 to determine a geo-grid size and position based on a maximum and minimum longitude and a maximum and minimum latitude of longitude data and latitude data in each primary dataset record 218. However, in some embodiments, the geo-grid engine 230 uses the secondary dataset records 219 to determine a geo-grid size and position based on a maximum and minimum longitude and a maximum and minimum latitude of longitude data and latitude data in each secondary dataset record 219. In some embodiments, the geo-grid engine 230 uses the latitude and longitude data from both the first and the secondary dataset records 218 and 219, respectively. While in still other embodiments, the geo-grid engine 230 maintains in a geo-grid cache 240 a geo-grid for all geographic areas of interest, such as, e.g., a geo-grid over the contiguous United States, a geo-grid over continental Europe, a geo-grid over continental Asia, a geo-grid over Australia, a geo-grid over Canada, a geo-grid over North America, a geo-grid for each state in the United States, or any other geographic region.

In some embodiments, the geo-grid includes a two-dimensional grid of geo-grid cells. Each geo-grid cell may include a square grid space formed from a grid of perpendicularly intersecting grid-lines. Each grid-line may be spaced according to a step size based on the threshold geographic distance 231. In some embodiments, the threshold geographic distance 213 includes one mile. Thus, the spacing between grid-lines is one mile and each geo-grid cell has a height and a width of one mile. In some embodiments, the geo-grid constructor 233 may map the grid-lines, and thus the geo-grid cells, to the desired geographic area based on latitude and longitude based on the boundaries of the geo-grid as described above and the step size of the grid lines. In some embodiments, each resulting geo-grid cell may correspond to a longitude-latitude of, e.g., a center of the geo-grid cell, a vertex of the geo-grid cell, of each vertex of the geo-grid cell, or of a longitude range and latitude range associated with the geo-grid cell, among other identification techniques and combinations thereof.

In some embodiments, the geo-grid constructor 233 may assign each grid cell an index based on its location in the geo-grid. For example, the grid-lines may form a rectangular grid including rows and columns. Each row and each column may be assigned an index, such as, e.g., alphabetical characters assigned to each row (e.g., A, B, C, D, etc.), and numerical characters assigned to each column (e.g., 1, 2, 3, 4, etc.). However, other indices are also contemplated, such as, e.g., roman numerals, Greek lettering, or other indices, and the indices for the rows and columns may the same or different. In some embodiments, the row index and column index may be converted into one geo-grid index to identify each geo-grid cell to, e.g., reduce a two-dimensional identifier (e.g., [row_index, column_index]) to a one-dimensional index that may be used as a key for, e.g., a join operation. In some embodiments, the one-dimensional geo-grid index may be formed from the row index and the column index such as, e.g., if the number of columns is N, the row index is X, the column index is Y and the geo-grid cell index is Z, then the geo-grid cell index may be determined by, e.g., $Z = X*N + Y$, or other suitable transformation to convert a two-dimensional grid identifier to a one-dimensional index.

In some embodiments, the geo-grid constructor 233 may represent the geo-grid graphically based on a conversion between latitude or longitude and a graphical coordinate system, such as, e.g., horizontal and vertical distance based on, e.g., pixels, inches, centimeters, millimeters, percentage of width or height, fraction of width or height, or other graphical coordinate system. In some embodiments, the geo-grid may be represented as an array with rows and columns representing latitudinal and longitudinal displacement, respectively, according to the geo-grid spacing distance. Other data formats for the geo-grid are contemplated, including, e.g., a table, a list, a tuple, text, among others and combinations thereof that correlates a geo-grid index to a central longitude and latitude of a corresponding geo-grid cell. The geo-grid may then be stored for quick and efficient access and use in a geo-grid cache 240 so that the geo-grid engine 230 may reference the geo-grid.

However, in some embodiments, because lines of longitude vary by an angle or rotation about an axis of the Earth, the distance between lines of longitude varies depending on proximity to the poles. Thus, to make truly square geo-grid cells, the variation in distance between lines of longitude with respect to latitude may be compensated for with a geo-grid cell compensator 234. In some embodiments, the geo-grid cell compensator 234 may, rather than user lines of longitude, adjust the grid lines to conform to step sizes in a distance along a surface of the Earth. In some embodiments, the geo-grid cell compensator 234 may access the geo-grid constructed by the geo-grid constructor 233 and cached in the geo-grid cache 240 and, starting at a center latitude-longitude position, iterate through the grid lines outward from the center position. In some embodiments, the geo-grid cell compensator 234 may adjust the latitude and longitude trajectory of each grid line based on a geographic distance from a previous grid-line such that all grid-lines maintain a spacing between grid-lines conforming to the step size regardless of the latitude. The resulting geo-grid may be cached in the geo-grid cache 240.

In some embodiments, the geo-grid engine 230 may instantiate a record mapper 235 to map each record form the primary dataset records 218 and the secondary dataset records 219 to geo-grid cells of the geo-grid.

In some embodiments, the record mapper 235 may compare the latitude data and the longitude data of each record to the latitude data and the longitude data of each geo-grid cell. Based on the longitude data and the latitude data of each record, each record is therefore matched to a geo-grid cell. In some embodiments, the record mapper 235 may add the index corresponding to the matching geo-grid cell to the data of the corresponding record, including the primary dataset records 218 and the secondary dataset records 219. Thus, based on the location data of the records and of the geo-grid cells, each record may be assigned a geo-grid cell using an associated geo-grid cell index. Additionally, each primary dataset record 218 or each secondary dataset record 219 may also be associated with the geo-grid cells adjacent to the assigned geo-grid cell (e.g., a central assigned geo-grid cell and the eight surrounding geo-grid cells). In some embodiments, the secondary dataset records 219 are assigned the central geo-grid cell and the eight surround geo-grid cells to facilitate matching of the primary dataset records 218 to secondary dataset records 219 in the given area around each respective primary dataset record 218. However, the surrounding geo-grid cells may include more than the eight adjacent cells but may also include cells of any configuration around the central assigned geo-grid cell, e.g., any number of rings of geo-grid cells, where each subsequent ring includes the geo-grid cells adjacent to a preceding, interior, ring of geo-grid cells proximal to the central assigned geo-grid cell.

In some embodiments, the geo-grid engine 230 may filter out non-matching secondary records for each primary record by instantiating a geo-grid grid matching area selector 236 and distance filter 237. In some embodiments, the geo-grid grid matching area selector 236 iterates through each primary dataset record 218. For each primary dataset record 218, the geo-grid grid matching area selector 236 extracts the geo-grid cell index and determines the associated geo-grid cell. In some embodiments, the geo-grid grid matching area selector 236 may then select a grid matching area of geo-grid cells that are within a threshold cell distance 232, e.g., including the eight adjacent geo-grid cells to the assigned geo-grid cell, and, in some embodiments, additional rings of geo-grid cells, as described above, based on geo-grid cells within a radius of the threshold cell distance 232 around the assigned geo-grid cell. Here, the threshold cell distance 232 refers to the difference in location on the geo-grid as measured by geo-grid cells. For example, a cell distance of 1 would refer to a geo-grid cell that is one cell away.

In some embodiments, each secondary data record 219 is also associated with a grid matching area of geo-grid cells within the threshold cell distance 232 around a geo-grid cell assigned to each respective secondary dataset record 219. Thus, similar to as described above, the geo-grid matching area selector 236 may identify geo-grid cells within a radius of the threshold distance 232 around a central assigned geo-grid cell of each secondary dataset record 219.

In some embodiments, the geo-grid grid matching area selector 236 assigns grid matching areas to each primary dataset record 218 or secondary dataset record 219 in time with the record mapper 235 assigning geo-grid cells. In some embodiments, however, the record mapper 235 assigns geo-grid cells to each record in one or both of the primary dataset records 218 and secondary dataset record 219 before the geo-grid grid matching area selector 236 assigns grid matching areas. In some embodiments, a predetermined number of records are processed by the record mapper 235 before being processed by the geo-grid grid matching area selector 236. In some embodiments, one or both of the record mapper 235 and the geo-grid grid matching area selector 236 is configured to assign both of the central geo-grid cell and the grid matching area for each record.

In some embodiments, the threshold cell distance 232 may include, e.g., 1 cell, 2 cells, 5 cells, 10 cells, or other cell distance. In some embodiments, the threshold cell distance 232 may be predetermined, however in some embodiments a user may configure a threshold cell distance 232 via the user input device, such as the user input device 102 described above.

In some embodiments, the geo-grid grid matching area selector 236 may then select candidate matching records of the secondary dataset records 219. In some embodiments, the geo-grid grid matching area selector 236 may extract the geo-grid cell index assigned to each secondary dataset record 219 and compare the index to the indices of each geo-grid cell in the grid matching area. Where the indices match, the geo-grid grid matching area selector 236 identifies the corresponding secondary dataset record 219 as a candidate matching record and adds the candidate matching record to, e.g., a list including a candidate matching set of the candidate matching records associated with the primary dataset record of the grid matching area. The matching area selector 236 generates a grid matching area for each primary dataset record 218 and identifies the candidate matching records of each primary dataset record 218 using the corresponding grid matching area to construct a candidate set for each primary dataset record 218. In some embodiments, the grid matching area selector 236 also generates a grid matching area for each secondary dataset record 219 as well. Thus, to match records, a join operation can be performed between the primary dataset records 218 and the secondary dataset records 219 to join records having overlapping grid matching areas.

In some embodiments, the geo-grid engine 230 may further refine the candidate set for primary dataset record 218 using a distance filter 237. Because of the shape of grid matching area (e.g., a square), secondary records within the grid matching area may be further from the corresponding primary dataset record than the threshold geographic distance 231. However, in some embodiments, the distance filter 237 may remove candidate records from the candidate set of a primary dataset record where the removed candidate records are further from the primary dataset record than the threshold geographic distance 231. As a result, in some embodiments, the distance filter 237 use the latitude and longitude data of a primary dataset record and each record in the associated candidate set to calculate an absolute distance between the primary dataset record and each candidate matching record. Where the absolute distance is greater than the threshold geographic distance 231, the associated candidate matching record is removed from the candidate set. In some embodiments, the geo-grid engine 230 may generate the resulting candidate set 260 for each primary dataset record and, e.g., store the candidate sets 260 in a memory, such as the memory 104 described above.

Figure 3:
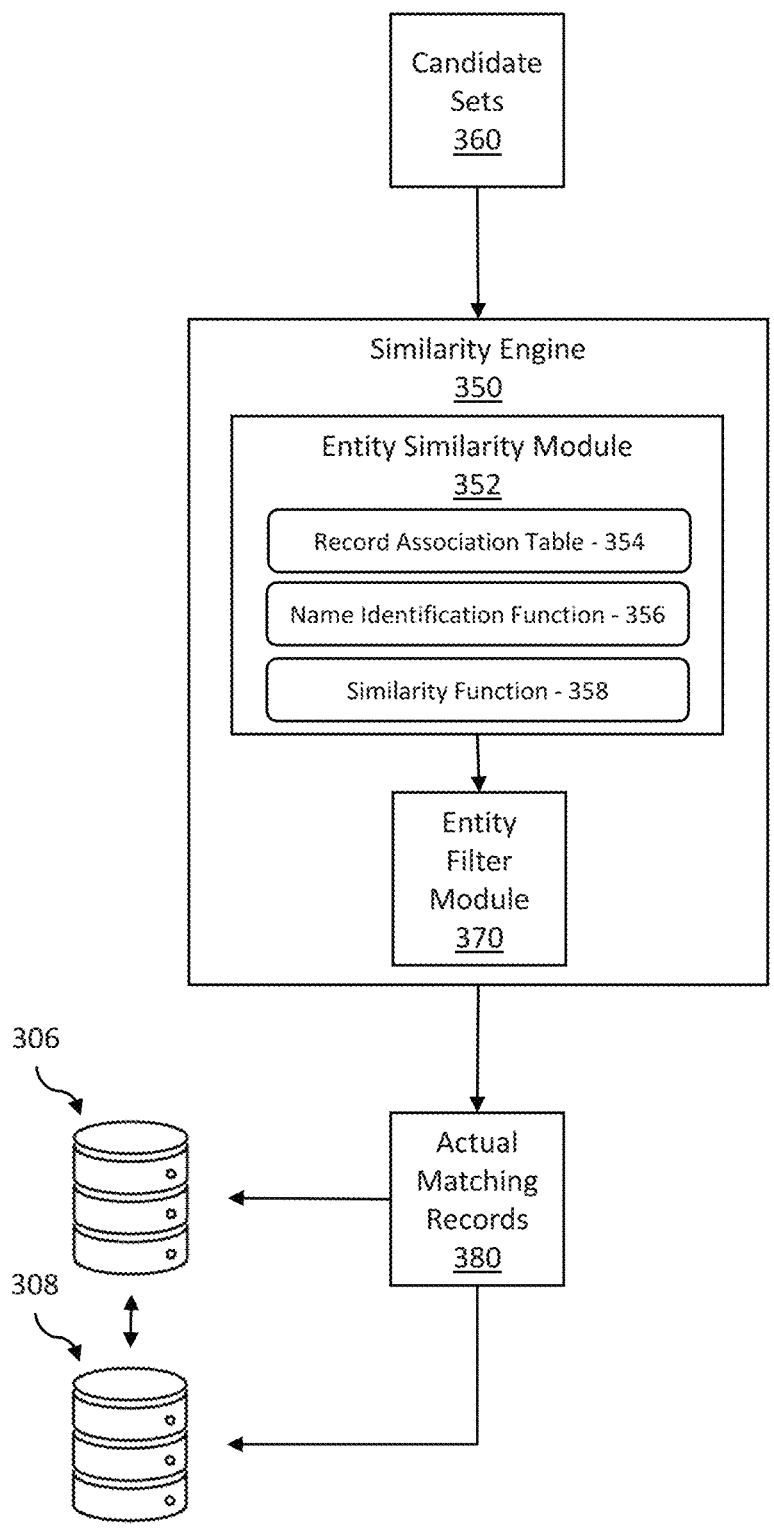

FIG. 3 is a grid matching area diagram of another exemplary computer-based system entity resolution with geo-grid filtering in accordance with one or more embodiments of the present disclosure.

In some embodiments, a matching engine 350 may receive candidate matching sets 360 with each candidate matching set having candidate matching records from a secondary dataset for each record in a primary dataset. In some embodiments, the matching engine 150 may compare data from the primary records to data of each candidate matching record in each respective candidate matching set 360 to determine a similarity score for each candidate matching record. In some embodiments, the similarity score is based on, e.g., a name similarity associated with a similarity between entity name data of the primary records and the secondary records.

In some embodiments, the candidate matched records of the candidate sets 360 are analyzed by an entity similarity module 352 of the similarity engine. In some embodiments, the entity similarity module 352 implements similarity algorithms that compare a primary source record with its associated candidate matching records as set forth in the candidate sets 360. For example, the entity similarity module 352 may construct a record association table 354 having rows with a candidate pair of a primary dataset record and a candidate matching record. For example, where the candidate sets 360 include a primary dataset record correlated to a list, table, array, or other data structure having a candidate set 360, the entity similarity module 352 may create a row in the table 354 for each candidate matching record in the candidate set 360, where the row has a column for the candidate matching record and a column for the associated primary dataset record. Each column may include, e.g., sub-columns, lists or sub-rows for each of, e.g., the associated record identifier, the entity name data, the latitude data, the longitude data, among other record data. A third column for each row may then be appended to the table 354 to enter similarity scores for the candidate matching record in each corresponding row.

In some embodiments, the entity similarity module 352 identifies entity names in the record data of the table 354 using, e.g., name identification functions 356. In some embodiments, the name identification functions 356 may include parser functions constructed for the format of entity records such as the primary dataset records and the secondary dataset records. In some embodiments, the records have pre-processed, such as by a pre-processor 120 described above, to confirm to a predetermined format. Thus, the parser functions of the name identification functions 356 may be configured to identify and extract, e.g., to a cache, the name data recorded in each record. However, in some embodiments, the name identification functions 356 may include parser functions to semantically parse the records and use, e.g., machine learning classifiers, to identify and recognize entity name data.

In some embodiments, the entity similarity module 352 may utilize a similarity function 358 to analyze the extracted name data for each row in the record association table 354. In some embodiments, the similarity function 358 compares the name data from the primary dataset record and the candidate matching record in each row of the record association table 354 to determine a similarity score. In some embodiments, the name data includes character strings and the similarity function 358 includes n-gram similarity. In some embodiments, the n-gram similarity includes, e.g., trigram similarity and the similarity engine 350 assesses the trigram similarity between the character strings of the name data of each of the primary dataset record and the candidate matching record. For example, the similarity engine 350 may break up each text string into trigrams of, e.g., letters, syllables, words or a combination thereof. The similarity function 358, when employed by the similarity engine 350, may count the number of trigrams in common between the name data of each candidate matching record and its associated primary dataset record. The number of common trigrams may be normalized by, e.g., string length of the name data of the candidate matching record and entered into the corresponding score column in record association table 354.

In some embodiments, an entity filter module 370 may receive the record associated table 354 with similarity scores appended to each row. Thus, each candidate matching record is associated with a primary dataset record and similarity score to the primary dataset record. In some embodiments, the entity filter module 370 may filter the candidate matching records in the record association table 354 based on similarity score. For example, the entity filter module 370 may compare each similarity score to a similarity threshold. In some embodiments, the similarity threshold may be, e.g., 0.4, 0.6, predetermined or user configured. A higher threshold increases the accuracy of match determinations but increases the risk of incorrectly removing actual matches. In some embodiments, the candidate matching records having a score above the threshold may be added to a set of actual matching records 380.

In some embodiments, the similarity engine 350 provides the actual matching records 380 to a primary database 306 associated with the primary dataset, such as, e.g., the first source database 106 described above. The actual matching records 380 may be associated with the matching secondary records. In some embodiments, data from each actual matching record 380 may be merged into the corresponding primary dataset record to remove duplicative data but combined differing data.

In some embodiments, the similarity engine 350 may also provide the actual matching records 380 to a secondary database 308 storing the secondary dataset, such as, e.g., the second source database 108 described above. In some embodiments, the similarity engine 350 may remove the actual matching records 380 from the secondary dataset in the secondary database 308. In some embodiments, the remaining data from the secondary dataset without the actual matching records 380 may be merged into the primary dataset as new primary dataset records associated with new entities, thus resolving the entity records of the primary and secondary datasets.

Figure 4:
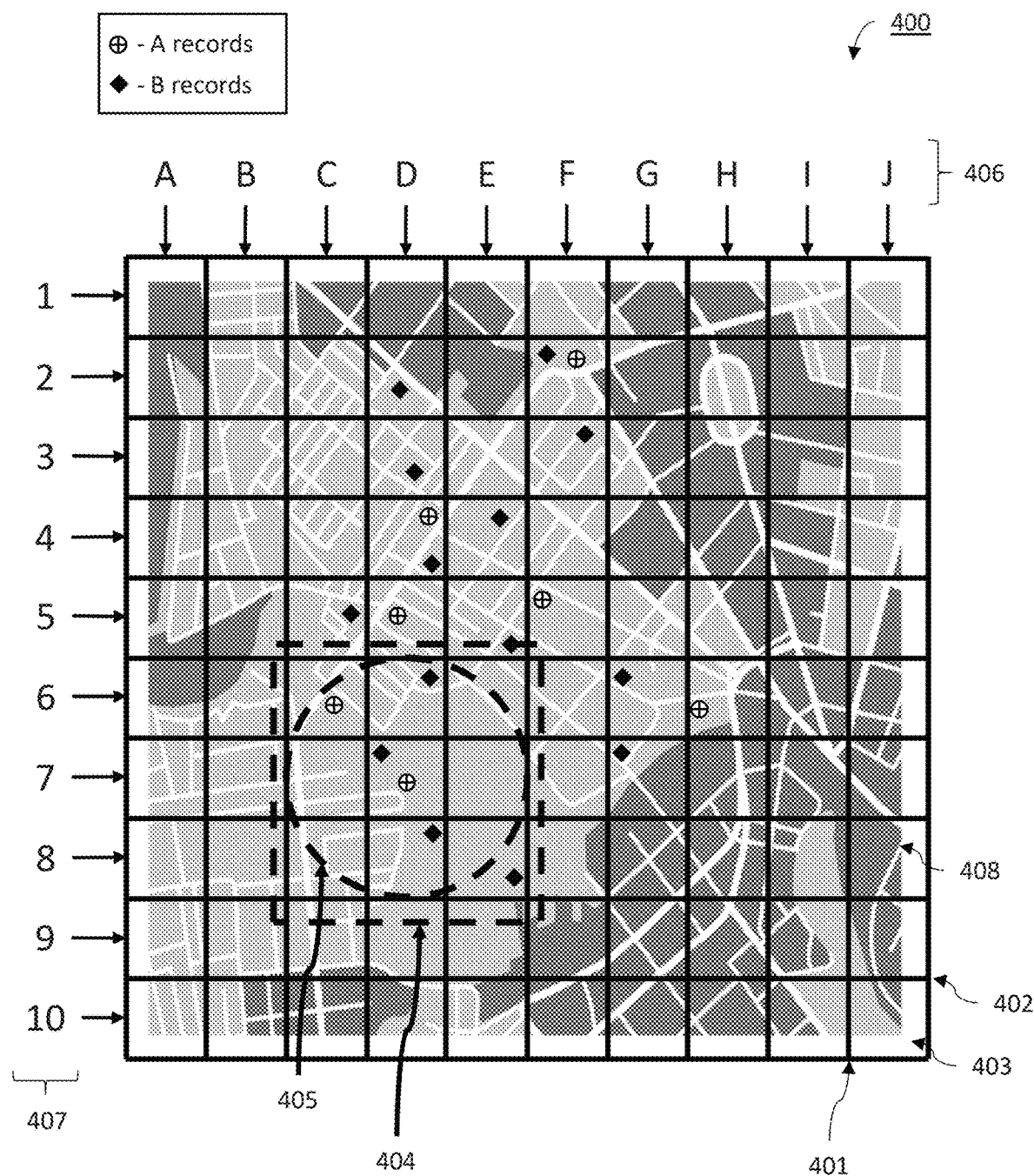

FIG. 4 is an illustration of a geo-grid for geo-grid filtering in an exemplary computer-based system for entity resolution with geo-grid filtering in accordance with one or more embodiments of the present disclosure.

In some embodiments, an entity resolution system utilizes a geo-grid 400 to quickly and efficiently determine candidate matches of, e.g., B records that may match each, e.g., A record. In some embodiments, the geo-grid 400 includes vertically oriented grid-lines 401 spaced apart by a step size and horizontal grid-lines 402 spaced apart by the step size. As a result, the geo-grid 400 may include geo-grid cells 403 including square grid spaces bounded by adjacent vertical grid-lines 401 on the sides and by adjacent horizontal grid-lines 402 on the top and bottom.

Column indices 406 may be assigned to spaces between vertical grid-lines 401, while row indices 407 may be assigned to spaces between horizontal grid-lines 402. Thus, each geo-grid cell 403 may be identified by a corresponding pair of column and row indices 406 and 407, respectively.

In some embodiments, both the A records and the B records are mapped to the geo-grid 400 using, e.g., a latitude and longitude of the records and of the geographic region associated with the geo-grid 400. For a given A record, a grid matching area 404 can be generated based on, e.g., a threshold cell distance. In some embodiments, such as depicted in FIG. 4, the cell threshold distance is 1 cell. Thus, the grid matching area 404 includes the geo-grid cells within one cell of the geo-grid cell of a given A record.

For example, an A record is located in geo-grid cell D-7. Thus, with a cell distance threshold of 1, the grid matching area 404 includes geo-grid cells, C-6, C-7, C-8, D-6, D-7, D-8, E-6, E-7, and E-8. Each B record within the grid matching area 404 may be determined as a candidate matching record for the given A record and added to a candidate set of the given A record. Some B records within the grid matching area 404 may nevertheless be geographically further from the A record than, e.g., a threshold geographic distance 405. In some embodiments, the B records outside of the threshold geographic distance 405 may be removed from a candidate set of the respective primary dataset record.

Figure 5:
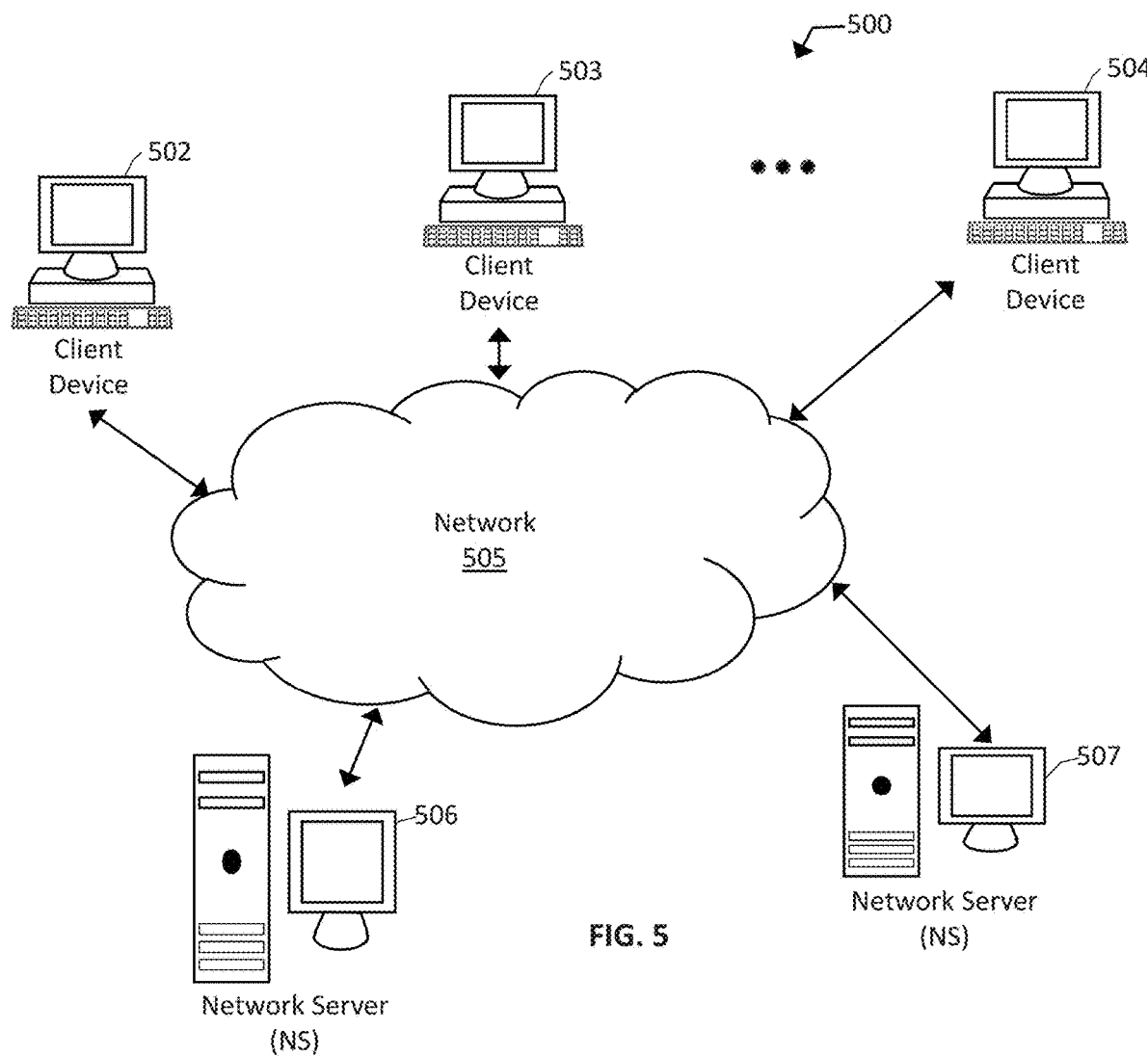

FIG. 5 depicts a block diagram of an exemplary computer-based system 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative embodiments of computing devices and the illustrative embodiments of computing components of the exemplary computer-based system 500 may be configured to manage a large number of members or concurrent transactions, as detailed herein. In some embodiments, the exemplary computer-based system 500 may be based on a scalable computer and network architecture that incorporates varies strategies for assessing the data, caching, searching, and database connection pooling. An example of the scalable architecture is an architecture that is capable of operating multiple servers.

In some embodiments, referring to FIG. 5, members 502-504 (e.g., clients) of the exemplary computer-based system 500 may include virtually any computing device capable of receiving and sending a message over a network (e.g., cloud network), such as network 505, to and from another computing device, such as servers 506 and 507, each other, and the like. In some embodiments, the member devices 502-504 may be personal computers, multiprocessor systems, microprocessor-based or programmable consumer electronics, network PCs, and the like. In some embodiments, one or more member devices within member devices 502-504 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 502-504 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), or any other device that is equipped to communicate over a wired or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 502-504 may include may run one or more applications, such as Internet browsers, mobile applications, voice calls, video games, videoconferencing, and email, among others. In some embodiments, one or more member devices within member devices 502-504 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 502-504 may be specifically programmed by either Java, .Net, QT, C, C++ or other suitable programming language. In some embodiments, one or more member devices within member devices 502-504 may be specifically programmed include or execute an application to perform a variety of possible tasks, such as, without limitation, messaging functionality, browsing, searching, playing, streaming or displaying various forms of content, including locally stored or uploaded messages, images and video, and games.

In some embodiments, the exemplary network 505 may provide network access, data transport or other services to any computing device coupled to it. In some embodiments, the exemplary network 505 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 505 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 505 may include and implement, as an alternative or in conjunction with one or more of the above, a WiMAX architecture defined by the WiMAX forum. In some embodiments and, optionally, in combination of any embodiment described above or below, the exemplary network 505 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 505 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 505 may also include mass storage, such as network attached storage (NAS), a storage area network (SAN), a content delivery network (CDN) or other forms of computer or machine readable media.

In some embodiments, the exemplary server 506 or the exemplary server 507 may be a web server (or a series of servers) running a network operating system, examples of which may include but are not limited to Microsoft Windows Server, Novell NetWare, or Linux. In some embodiments, the exemplary server 506 or the exemplary server 507 may be used for or provide cloud and network computing. Although not shown in FIG. 5, in some embodiments, the exemplary server 506 or the exemplary server 507 may have connections to external systems like email, SMS messaging, text messaging, ad content providers, etc. Any of the features of the exemplary server 506 may be also implemented in the exemplary server 507 and vice versa.

In some embodiments, one or more of the exemplary servers 506 and 507 may be specifically programmed to perform, in non-limiting example, as authentication servers, search servers, email servers, social networking services servers, SMS servers, IM servers, MMS servers, exchange servers, photo-sharing services servers, advertisement providing servers, financial or banking-related services servers, travel services servers, or any similarly suitable service-base servers for users of the member computing devices 501-504.

In some embodiments and, optionally, in combination of any embodiment described above or below, for example, one or more exemplary computing member devices 502-504, the exemplary server 506, or the exemplary server 507 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 6:
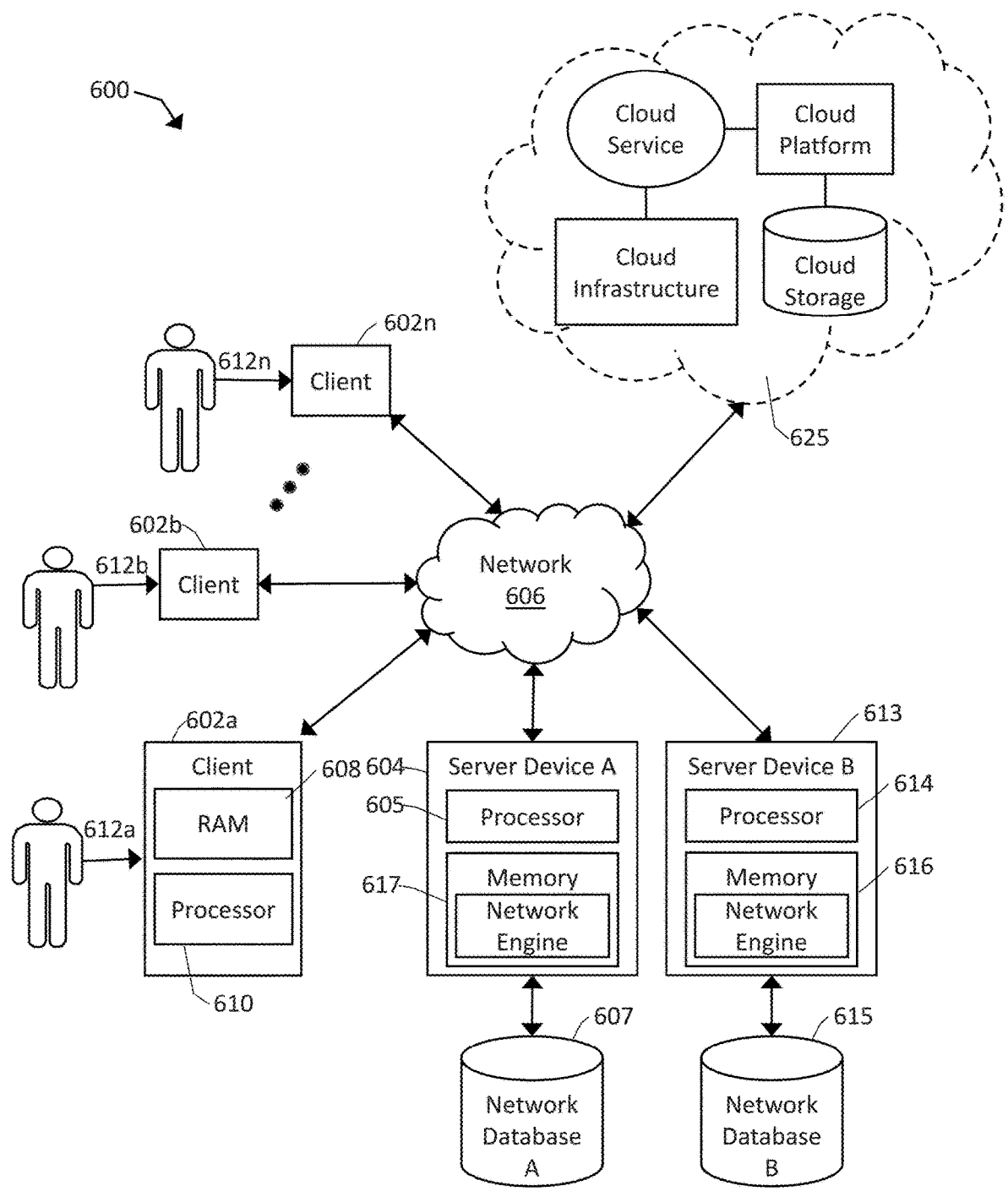

FIG. 6 depicts a block diagram of another exemplary computer-based system 600 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 602*a*, 602*b* thru 602*n* shown each at least includes a computer-readable medium, such as a random-access memory (RAM) 608 coupled to a processor 610 or FLASH memory. In some embodiments, the processor 610 may execute computer-executable program instructions stored in memory 608. In some embodiments, the processor 610 may include a microprocessor, an ASIC, or a state machine. In some embodiments, the processor 610 may include, or may be in communication with, media, for example computer-readable media, which stores instructions that, when executed by the processor 610, may cause the processor 610 to perform one or more steps described herein. In some embodiments, examples of computer-readable media may include, but are not limited to, an electronic, optical, magnetic, or other storage or transmission device capable of providing a processor, such as the processor 610 of client 602*a*, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 602*a* through 602*n* may also comprise a number of external or internal devices such as a mouse, a CD-ROM, DVD, a physical or virtual keyboard, a display, a speaker, or other input or output devices. In some embodiments, examples of member computing devices 602*a* through 602*n* (e.g., clients) may be any type of processor-based platforms that are connected to a network 606 such as, without limitation, personal computers, digital assistants, personal digital assistants, smart phones, pagers, digital tablets, laptop computers, Internet appliances, and other processor-based devices. In some embodiments, member computing devices 602*a* through 602*n* may be specifically programmed with one or more application programs in accordance with one or more principles and methodologies detailed herein. In some embodiments, member computing devices 602*a* through 602*n* may operate on any operating system capable of supporting a browser or browser-enabled application, such as Microsoft™, Windows™, or Linux. In some embodiments, member computing devices 602*a* through 602*n* shown may include, for example, personal computers executing a browser application program such as Microsoft Corporation's Internet Explorer™, Apple Computer, Inc.'s Safari™, Mozilla Firefox, or Opera. In some embodiments, through the member computing client devices 602*a* through 602*n*, users, 612*a* through 602*n*, may communicate over the exemplary network 606 with each other or with other systems and devices coupled to the network 606. As shown in FIG. 6, exemplary server devices 604 and 613 may be also coupled to the network 606. In some embodiments, one or more member computing devices 602*a* through 602*n* may be mobile clients.

In some embodiments, at least one database of exemplary databases 607 and 615 may be any type of database, including a database managed by a database management system (DBMS). In some embodiments, an exemplary DBMS-managed database may be specifically programmed as an engine that controls organization, storage, management, and retrieval of data in the respective database. In some embodiments, the exemplary DBMS-managed database may be specifically programmed to provide the ability to query, backup and replicate, enforce rules, provide security, compute, perform change and access logging, and automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and objects. In some embodiments, the exemplary DBMS-managed database may be specifically programmed to include metadata about the data that is stored.

Figure 7:
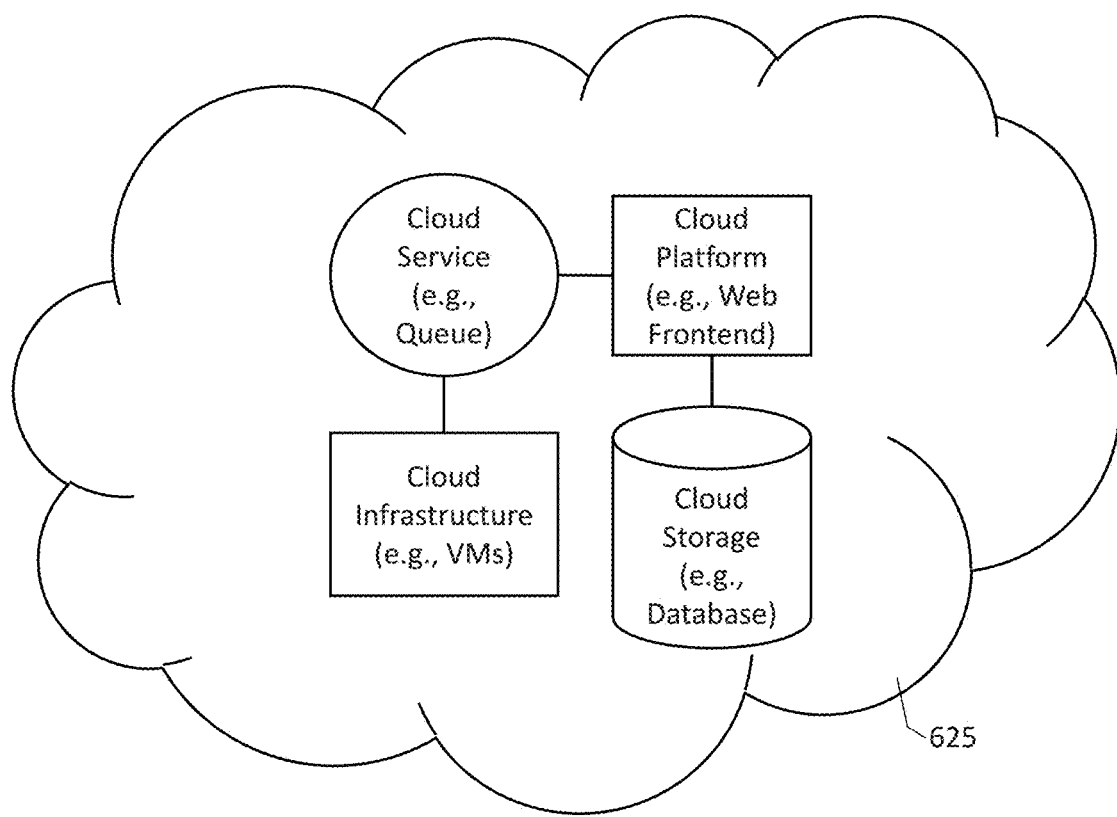
Figure 8:
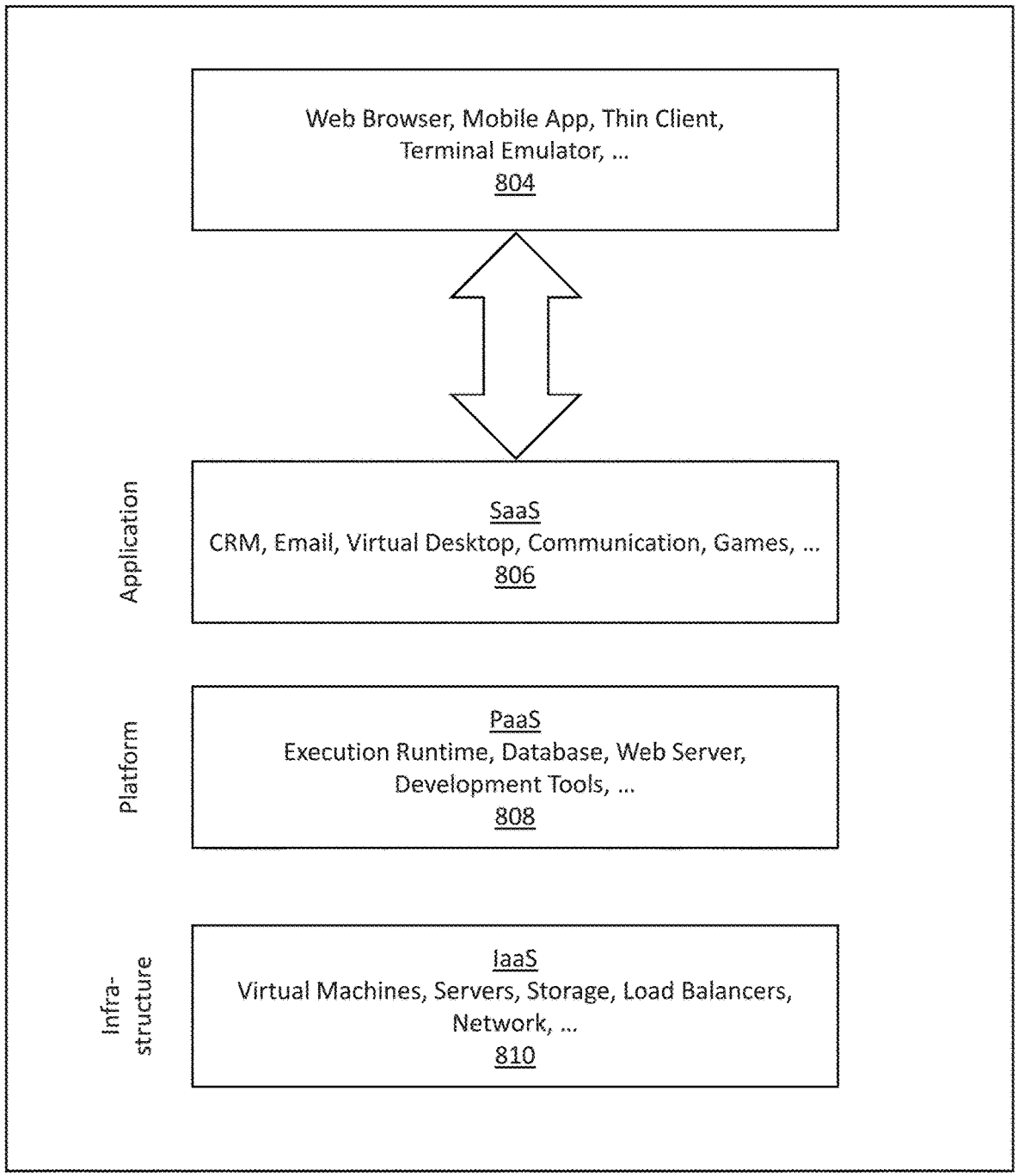

In some embodiments, the illustrative embodiments of computer-based systems of the present disclosure may be specifically configured to operate in a cloud computing architecture such as, but not limiting to: infrastructure a service (IaaS), platform as a service (PaaS), and software as a service (SaaS). FIGS. 7 and 8 illustrate schematics of exemplary implementations of the cloud computing architecture(s) in which the illustrative embodiments of computer-based systems of the present disclosure may be specifically configured to operate.

In some embodiments, the exemplary inventive computer-based systems, the exemplary inventive computer-based devices, or the exemplary inventive computer-based components of the present disclosure may be configured to utilize one or more exemplary AI or machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:
i) Define Neural Network architecture/model,
ii) Transfer the input data to the exemplary neural network model,
iii) Train the exemplary model incrementally,
iv) determine the accuracy for a specific number of timesteps,
v) apply the exemplary trained model to process the newly-received input data,
vi) optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values or functions and aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function or the activation function to make the node more or less likely to be activated.

At least some aspects of the present disclosure will now be described with reference to the following numbered clauses.

1. A method comprising:
  receiving, by at least one processor, at least one first dataset from a first database associated with a first entity;
    wherein the at least one first dataset comprises a plurality of first entity data records;
    wherein each of the first entity data records comprises:
      i) first latitude data representing at least one first latitude associated with at least one first physical location at which each of the first entity data records has been generated, and
      ii) first longitude data representing at least one first longitude associated with the at least one first physical location at which each of the first entity data records has been generated;
  receiving, by the at least one processor, at least one second dataset from an at least one second database associated with at least one second entity;
    wherein the at least one second dataset comprises a plurality of second entity data records;
      i) at least one second latitude data representing at least one second latitude associated with at least one second physical location at which each of the at least one second entity data records has been generated, and
      ii) at least one second longitude data representing at least one second longitude associated with the at least one second physical location at which each of the at least one second entity data records has been generated;
  generating, by the at least one processor, at least one geo-grid mapped to at least one geographical area covering the plurality of first entity data records and the plurality of second entity data records;
    wherein the at least one geo-grid comprises a plurality of respective grid spaces representing a plurality of respective geographical sub-areas;
    wherein the plurality of respective grid spaces are defined by respective latitudinal widths and respective longitudinal heights;
    wherein each pair of a respective latitudinal width and a respective longitudinal height is based on a predetermined distance threshold between a plurality of candidate matching records of the plurality of first entity data records and the plurality of second entity data records;
  generating, by the at least one processor, at least one respective grid matching area in the at least one geo-grid for at least one respective first entity data record based at least in part on the first latitude data and the first longitude data of the at least one respective first entity data record;
    wherein the at least one respective grid matching area for the at least one respective first entity data record comprises:
      i) a first entity data record grid space of the plurality of respective grid spaces in the at least one geo-grid, wherein the first entity data record grid space is associated with a respective pair of the respective latitude and the respective longitude for each respective first entity data records, and
      ii) a plurality of neighboring grid spaces that neighbor the first entity data record grid space in the at least one geo-grid;

determining, by the at least one processor, the plurality of candidate matching records from the plurality of second entity data records that potentially matches to the plurality of first entity data records and the plurality of second entity data records based on the at least one respective grid matching area;
  wherein the plurality of candidate matching records are records that have respective latitudes and respective longitudes match the at least one respective grid matching area;
determining, by the at least one processor, a plurality of actual matching records from the plurality of candidate matching records based on a predetermined threshold for a trigram similarity between each candidate matching record of the plurality of candidate matching records and the at least one respective first entity data record;
extracting, by the at least one processor, the plurality of actual matching records from the at least one second dataset;
storing, by the at least one processor, the plurality of actual matching records in the first database; and
associating, by the at least one processor, the plurality of actual matching records in the first database with the at least one respective first entity data record.

2. The method of clause 1, further comprising:
determining, by the at least one processor, a distance between each candidate matching record of the plurality of candidate matching records and the at least one respective first entity data record based at least on the latitude and the longitude associated with the at least one respective first entity data records and the latitude and the longitude associated with each of the at least one second entity data records of the plurality of candidate matching records; and
removing, by the at least one processor, non-matching records from the plurality of candidate matching records based on a matching distance threshold.

3. The method of clause 2, wherein the matching distance threshold comprises about three miles.

4. The method of clause 1, wherein the predetermined distance threshold comprises about three miles.

5. The method of clause 1, further comprising:
receiving, by the at least one processor, a ground-truth dataset of matching entity records;
  wherein the matching entity records comprise respective distances between each respective pair of candidate matching records; and
determining, by the at least one processor, the predetermined distance threshold based on a percentile threshold of the respective distances.

6. The method of clause 5, wherein the percentile threshold comprises approximately a ninety seventh percentile distance of the respective distances.

7. The method of clause 1, further comprising:
determining, by the at least one processor, the longitudinal heights of each grid space by converting the predetermined distance threshold into longitudinal displacement; and
determining, by the at least one processor, the latitudinal widths of each grid space by converting the predetermined distance threshold into latitudinal displacement.

8. The method of clause 1, further comprising causing to display, by the at least one processor, a match complete indication on a screen of at least one computing device associated with at least one user upon a selection by the at least user to match the at least one first dataset and the at least one second dataset.

9. The method of clause 1, further comprising:
determining, by the at least one processor, a respective second entity data record grid space associated with each respective at least one second entity data record based on a respective latitude associated with each respective at least one second entity data record and a respective longitude associated with each respective at least one second entity data record; and
determining, by the at least one processor, the plurality of candidate matching records of the at least one second entity data records using a join operation to join together each respective at least one second entity data record have a respective second entity data record grid space matching the respective grid matching area.

10. The method of clause 1, wherein the respective latitudinal widths and the respective longitudinal heights of the grid squares are equal.

11. A method comprising:
receiving, by at least one processor, at least one first dataset from a first database associated with a first entity;
  wherein the at least one first dataset comprises a plurality of first entity data records;
  wherein each of the first entity data records comprises:
    i) first latitude data representing at least one first latitude associated with at least one first physical location at which each of the first entity data records has been generated, and
    ii) first longitude data representing at least one first longitude associated with the at least one first physical location at which each of the first entity data records has been generated;
receiving, by the at least one processor, at least one second dataset from an at least one second database associated with at least one second entity;
  wherein the at least one second dataset comprises a plurality of second entity data records;
    i) at least one second latitude data representing at least one second latitude associated with at least one second physical location at which each of the at least one second entity data records has been generated, and
    ii) at least one second longitude data representing at least one second longitude associated with the at least one second physical location at which each of the at least one second entity data records has been generated;
generating, by the at least one processor, at least one geo-grid mapped to at least one geographical area covering the plurality of first entity data records and the plurality of at one second entity data records;
  wherein the at least one geo-grid comprises a plurality of respective grid spaces representing a plurality of respective geographical sub-areas;
  wherein the plurality of respective grid spaces are defined by respective latitudinal widths and respective longitudinal heights;
  wherein each pair of a respective latitudinal width and a respective longitudinal height are based on a predetermined distance threshold between a plurality of candidate matching records of the plurality of first entity data record and the plurality of second entity data records;
generating, by the at least one processor, at least one respective grid matching area in the at least one geo-grid;
  wherein the respective grid matching area comprises:
    i) a central grid space of the grid spaces in the geo-grid, and
    ii) a plurality of neighboring grid spaces that neighbor the central grid space in the at least one geo-grid;

determining, by the at least one processor, a plurality of matching first entity data records of the plurality of first entity data records based on the at least one respective grid matching area;
  wherein the plurality of matching first entity data records are record that have respective latitudes and respective longitudes that match the at least one respective grid matching area;
  determining, by the at least one processor, a plurality of matching second entity data records of the plurality of second entity data records based on the at least one respective grid matching area;
    wherein the plurality of matching second entity data records are record that have respective latitudes and respective longitudes that match the at least one respective grid matching area;
  determining, by the at least one processor, a plurality of actual matching records from the plurality of matching second entity data records based on a predetermined threshold for a trigram similarity between each matching second entity data record of the plurality of matching second entity data records and each matching first entity data record of the plurality of matching first entity data records;
  extracting, by the at least one processor, the plurality of actual matching records from the at least one second dataset;
  storing, by the at least one processor, the plurality of actual matching records in the first database; and
  associating, by the at least one processor, the plurality of actual matching records in the first database with the at least one respective first entity data records.

12. The method of clause 11, further comprising:
  determining, by the at least one processor, a distance between each matching first entity data record and each matching second entity data record based at least on a respective pair of the latitude and the longitude associated with each respective first entity data record of the plurality of matching first entity data records and a respective pair of the latitude and the longitude associated with each respective second entity data record of the plurality of matching second entity data records; and
  removing, by the at least one processor, non-matching records from the plurality of candidate matching records based on a matching distance threshold.

13. The method of clause 12, wherein the matching distance threshold comprises about three miles.

14. The method of clause 11, wherein the predetermined distance threshold comprises about three miles.

15. The method of clause 11, further comprising:
  receiving, by the at least one processor, a ground-truth dataset of matching entity records;
    wherein the matching entity records comprise respective distances between respective actual matching records; and
  determining, by the at least one processor, the predetermined distance threshold based on a percentile threshold of the respective distances.

16. The method of clause 15, wherein the percentile threshold comprises approximately a ninety seventh percentile distance of the respective distances.

17. The method of clause 11, further comprising:
  determining, by the at least one processor, the longitudinal heights of each grid space by converting the predetermined distance threshold into longitudinal displacement; and
  determining, by the at least one processor, the latitudinal widths of each grid space by converting the predetermined distance threshold into latitudinal displacement.

18. The method of clause 11, further comprising causing to display, by the at least one processor, a match complete indication on a screen of at least one computing device associated with at least one user upon a selection by the at least user to match the at least one first dataset and the at least one second dataset.

19. The method of clause 11, wherein the respective latitudinal widths and the respective longitudinal heights of the grid spaces are equal.

20. A system comprising:
  a first entity database configured to store at least one first dataset associated with at least one first entity;
    wherein the first dataset comprises a plurality of first entity data records;
    wherein each of the at least one first entity data records comprises:
      i) first latitude data representing at least one first latitude associated with at least one first physical location at which each of the first entity data records has been generated, and
      ii) first longitude data representing at least one first longitude associated with the at least one first physical location at which each of the first entity data records has been generated;
  at least one second entity database configured to store at least one second dataset associated with at least one second entity;
    wherein the at least one second dataset comprises a plurality of at least one second entity data records;
      i) at least one second latitude data representing at least one second latitude associated with at least one second physical location at which each of the at least one second entity data records has been generated, and
      ii) at least one second longitude data representing at least one second longitude associated with the at least one second physical location at which each of the at least one second entity data records has been generated;
  at least one processor configured to perform computer-readable instructions comprising:
    receiving the at least one first dataset from the first database associated with a first entity;
    receiving the at least one second dataset from the at least one second database associated with at least one second entity;
    generating at least one geo-grid mapped to at least one geographical area covering the plurality of first entity data records and the plurality of second entity data records;
      wherein the at least one geo-grid comprises a plurality of respective grid spaces representing a plurality of respective geographical sub-areas;
      wherein the plurality of respective grid spaces are defined by respective latitudinal widths and respective longitudinal heights;
      wherein each pair of a respective latitudinal width and a respective longitudinal height is based on a predetermined distance threshold between a plurality of candidate matching records of the plurality of first entity data records and the plurality of second entity data records;
    generating at least one respective grid matching area in the at least one geo-grid for at least one respective first entity data record based at least in part on the first latitude data and the first longitude data of the at least one respective first entity data record;

wherein the at least one respective grid matching area for the at least one respective first entity data record comprises:
  i) a first entity data record grid space of the plurality of respective grid spaces in the at least one geo-grid, wherein the first entity data record grid space is associated with a respective pair of the respective latitude and the respective longitude for each respective first entity data records, and
  ii) a plurality of neighboring grid spaces that neighbor the first entity data record grid space in the at least one geo-grid;
determining plurality of candidate matching records from the plurality of second entity data records that potentially matches to the plurality of first entity data records and the plurality of second entity data records based on the at least one respective grid matching area;
  wherein the plurality of candidate matching records are records that have respective latitudes and respective longitudes match the at least one respective grid matching area;
determining a plurality of actual matching records from the candidate matching records based on a predetermined threshold for a trigram similarity between each candidate matching record of the plurality of candidate matching records and the at least one respective first entity data record;
extracting the plurality of actual matching records from the at least one second dataset;
storing the plurality of actual matching records in the first database; and
associating the plurality of actual matching records in the first database with the at least one respective first entity data record.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems, and the inventive devices described herein can be utilized in any combination with each other. Further still, the various steps may be carried out in any desired order (and any desired steps may be added, or any desired steps may be eliminated).

The invention claimed is:

1. A method comprising:
receiving, by at least one processor, at least one first dataset from a first database associated with a first entity;
  wherein the at least one first dataset comprises a plurality of first entity data records;
  wherein each of the first entity data records comprises:
    i) first latitude data representing at least one first latitude associated with at least one first physical location at which each of the first entity data records has been generated, and
    ii) first longitude data representing at least one first longitude associated with the at least one first physical location at which each of the first entity data records has been generated;
receiving, by the at least one processor, at least one second dataset from an at least one second database associated with at least one second entity;
  wherein the at least one second dataset comprises a plurality of second entity data records;
    i) at least one second latitude data representing at least one second latitude associated with at least one second physical location at which each of the at least one second entity data records has been generated, and
    ii) at least one second longitude data representing at least one second longitude associated with the at least one second physical location at which each of the at least one second entity data records has been generated;
generating, by the at least one processor, at least one geo-grid mapped to at least one geographical area covering the plurality of first entity data records and the plurality of second entity data records;
  wherein the at least one geo-grid comprises a plurality of respective grid spaces representing a plurality of respective geographical sub-areas;
  wherein the plurality of respective grid spaces are defined by respective latitudinal widths and respective longitudinal heights;
  wherein each pair of a respective latitudinal width and a respective longitudinal height is based on a predetermined distance threshold between a plurality of candidate matching records of the plurality of first entity data records and the plurality of second entity data records;
generating, by the at least one processor, at least one respective grid matching area in the at least one geo-grid for at least one respective first entity data record based at least in part on the first latitude data and the first longitude data of the at least one respective first entity data record;
  wherein the at least one respective grid matching area for the at least one respective first entity data record comprises:
    i) a first entity data record grid space of the plurality of respective grid spaces in the at least one geo-grid, wherein the first entity data record grid space is associated with a respective pair of the respective latitude and the respective longitude for each respective first entity data records, and
    ii) a plurality of neighboring grid spaces that neighbor the first entity data record grid space in the at least one geo-grid;
determining, by the at least one processor, the plurality of candidate matching records from the plurality of second entity data records that potentially matches to the plurality of first entity data records and the plurality of second entity data records based on the at least one respective grid matching area;
  wherein the plurality of candidate matching records are records that have respective latitudes and respective longitudes match the at least one respective grid matching area;
determining, by the at least one processor, a plurality of actual matching records from the plurality of candidate matching records based on a predetermined threshold for a trigram similarity between each candidate matching record of the plurality of candidate matching records and the at least one respective first entity data record;
extracting, by the at least one processor, the plurality of actual matching records from the at least one second dataset;
storing, by the at least one processor, the plurality of actual matching records in the first database; and associating, by the at least one processor, the plurality of actual matching records in the first database with the at least one respective first entity data record.

2. The method of claim 1, further comprising:
determining, by the at least one processor, a distance between each candidate matching record of the plurality of candidate matching records and the at least one respective first entity data record based at least on the latitude and the longitude associated with the at least one respective first entity data records and the latitude and the longitude associated with each of the at least one second entity data records of the plurality of candidate matching records; and
removing, by the at least one processor, non-matching records from the plurality of candidate matching records based on a matching distance threshold.

3. The method of claim 2, wherein the matching distance threshold comprises about three miles.

4. The method of claim 1, wherein the predetermined distance threshold comprises about three miles.

5. The method of claim 1, further comprising:
receiving, by the at least one processor, a ground-truth dataset of matching entity records;
wherein the matching entity records comprise respective distances between each respective pair of candidate matching records; and
determining, by the at least one processor, the predetermined distance threshold based on a percentile threshold of the respective distances.

6. The method of claim 5, wherein the percentile threshold comprises approximately a ninety seventh percentile distance of the respective distances.

7. The method of claim 1, further comprising:
determining, by the at least one processor, the longitudinal heights of each grid space by converting the predetermined distance threshold into longitudinal displacement; and
determining, by the at least one processor, the latitudinal widths of each grid space by converting the predetermined distance threshold into latitudinal displacement.

8. The method of claim 1, further comprising causing to display, by the at least one processor, a match complete indication on a screen of at least one computing device associated with at least one user upon a selection by the at least user to match the at least one first dataset and the at least one second dataset.

9. The method of claim 1, further comprising:
determining, by the at least one processor, a respective second entity data record grid space associated with each respective at least one second entity data record based on a respective latitude associated with each respective at least one second entity data record and a respective longitude associated with each respective at least one second entity data record; and
determining, by the at least one processor, the plurality of candidate matching records of the at least one second entity data records using a join operation to join together each respective at least one second entity data record have a respective second entity data record grid space matching the respective grid matching area.

10. The method of claim 1, wherein the respective latitudinal widths and the respective longitudinal heights of the grid squares are equal.

11. A method comprising:
receiving, by at least one processor, at least one first dataset from a first database associated with a first entity;
wherein the at least one first dataset comprises a plurality of first entity data records;
wherein each of the first entity data records comprises:
i) first latitude data representing at least one first latitude associated with at least one first physical location at which each of the first entity data records has been generated, and
ii) first longitude data representing at least one first longitude associated with the at least one first physical location at which each of the first entity data records has been generated;
receiving, by the at least one processor, at least one second dataset from an at least one second database associated with at least one second entity;
wherein the at least one second dataset comprises a plurality of second entity data records;
i) at least one second latitude data representing at least one second latitude associated with at least one second physical location at which each of the at least one second entity data records has been generated, and
ii) at least one second longitude data representing at least one second longitude associated with the at least one second physical location at which each of the at least one second entity data records has been generated;
generating, by the at least one processor, at least one geo-grid mapped to at least one geographical area covering the plurality of first entity data records and the plurality of at one second entity data records;
wherein the at least one geo-grid comprises a plurality of respective grid spaces representing a plurality of respective geographical sub-areas;
wherein the plurality of respective grid spaces are defined by respective latitudinal widths and respective longitudinal heights;
wherein each pair of a respective latitudinal width and a respective longitudinal height are based on a predetermined distance threshold between a plurality of candidate matching records of the plurality of first entity data record and the plurality of second entity data records;
generating, by the at least one processor, at least one respective grid matching area in the at least one geo-grid;
wherein the respective grid matching area comprises:
i) a central grid space of the grid spaces in the geo-grid, and
ii) a plurality of neighboring grid spaces that neighbor the central grid space in the at least one geo-grid;
determining, by the at least one processor, a plurality of matching first entity data records of the plurality of first entity data records based on the at least one respective grid matching area;
wherein the plurality of matching first entity data records are record that have respective latitudes and respective longitudes that match the at least one respective grid matching area;
determining, by the at least one processor, a plurality of matching second entity data records of the plurality of second entity data records based on the at least one respective grid matching area;
wherein the plurality of matching second entity data records are record that have respective latitudes and respective longitudes that match the at least one respective grid matching area;

determining, by the at least one processor, a plurality of actual matching records from the plurality of matching second entity data records based on a predetermined threshold for a trigram similarity between each matching second entity data record of the plurality of matching second entity data records and each matching first entity data record of the plurality of matching first entity data records;

extracting, by the at least one processor, the plurality of actual matching records from the at least one second dataset;

storing, by the at least one processor, the plurality of actual matching records in the first database; and associating, by the at least one processor, the plurality of actual matching records in the first database with the at least one respective first entity data records.

12. The method of claim 11, further comprising:
determining, by the at least one processor, a distance between each matching first entity data record and each matching second entity data record based at least on a respective pair of the latitude and the longitude associated with each respective first entity data record of the plurality of matching first entity data records and a respective pair of the latitude and the longitude associated with each respective second entity data record of the plurality of matching second entity data records; and removing, by the at least one processor, non-matching records from the plurality of candidate matching records based on a matching distance threshold.

13. The method of claim 12, wherein the matching distance threshold comprises about three miles.

14. The method of claim 11, wherein the predetermined distance threshold comprises about three miles.

15. The method of claim 11, further comprising:
receiving, by the at least one processor, a ground-truth dataset of matching entity records;
wherein the matching entity records comprise respective distances between respective actual matching records; and
determining, by the at least one processor, the predetermined distance threshold based on a percentile threshold of the respective distances.

16. The method of claim 15, wherein the percentile threshold comprises approximately a ninety seventh percentile distance of the respective distances.

17. The method of claim 11, further comprising:
determining, by the at least one processor, the longitudinal heights of each grid space by converting the predetermined distance threshold into longitudinal displacement; and
determining, by the at least one processor, the latitudinal widths of each grid space by converting the predetermined distance threshold into latitudinal displacement.

18. The method of claim 11, further comprising causing to display, by the at least one processor, a match complete indication on a screen of at least one computing device associated with at least one user upon a selection by the at least user to match the at least one first dataset and the at least one second dataset.

19. The method of claim 11, wherein the respective latitudinal widths and the respective longitudinal heights of the grid spaces are equal.

20. A system comprising:
a first entity database configured to store at least one first dataset associated with at least one first entity;
wherein the first dataset comprises a plurality of first entity data records;
wherein each of the at least one first entity data records comprises:
  i) first latitude data representing at least one first latitude associated with at least one first physical location at which each of the first entity data records has been generated, and
  ii) first longitude data representing at least one first longitude associated with the at least one first physical location at which each of the first entity data records has been generated;
at least one second entity database configured to store at least one second dataset associated with at least one second entity;
wherein the at least one second dataset comprises a plurality of at least one second entity data records;
  i) at least one second latitude data representing at least one second latitude associated with at least one second physical location at which each of the at least one second entity data records has been generated, and
  ii) at least one second longitude data representing at least one second longitude associated with the at least one second physical location at which each of the at least one second entity data records has been generated;
at least one processor configured to perform computer-readable instructions comprising:
receiving the at least one first dataset from the first database associated with a first entity;
receiving the at least one second dataset from the at least one second database associated with at least one second entity;
generating at least one geo-grid mapped to at least one geographical area covering the plurality of first entity data records and the plurality of second entity data records;
  wherein the at least one geo-grid comprises a plurality of respective grid spaces representing a plurality of respective geographical sub-areas;
  wherein the plurality of respective grid spaces are defined by respective latitudinal widths and respective longitudinal heights;
  wherein each pair of a respective latitudinal width and a respective longitudinal height is based on a predetermined distance threshold between a plurality of candidate matching records of the plurality of first entity data records and the plurality of second entity data records;
generating at least one respective grid matching area in the at least one geo-grid for at least one respective first entity data record based at least in part on the first latitude data and the first longitude data of the at least one respective first entity data record;
  wherein the at least one respective grid matching area for the at least one respective first entity data record comprises:
    i) a first entity data record grid space of the plurality of respective grid spaces in the at least one geo-grid, wherein the first entity data record grid space is associated with a respective pair of the respective latitude and the respective longitude for each respective first entity data records, and ii) a plurality of neighboring grid spaces that neighbor the first entity data record grid space in the at least one geo-grid;

determining plurality of candidate matching records from the plurality of second entity data records that potentially matches to the plurality of first entity data records and the plurality of second entity data records based on the at least one respective grid matching area;

wherein the plurality of candidate matching records are records that have respective latitudes and respective longitudes match the at least one respective grid matching area;

determining a plurality of actual matching records from the candidate matching records based on a predetermined threshold for a trigram similarity between each candidate matching record of the plurality of candidate matching records and the at least one respective first entity data record;

extracting the plurality of actual matching records from the at least one second dataset;

storing the plurality of actual matching records in the first database; and associating the plurality of actual matching records in the first database with the at least one respective first entity data record.

* * * * *